United States Patent
Oomori et al.

(10) Patent No.: US 12,101,326 B2
(45) Date of Patent: Sep. 24, 2024

(54) USER APPARATUS AND EXTERNAL APPARATUS

(71) Applicant: NTT DOCOMO, INC., Chiyoda-ku (JP)

(72) Inventors: Kazuto Oomori, Chiyoda-ku (JP); Kouki Hayashi, Chiyoda-ku (JP); Osamu Goto, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 736 days.

(21) Appl. No.: 17/261,429

(22) PCT Filed: May 14, 2019

(86) PCT No.: PCT/JP2019/019154
§ 371 (c)(1),
(2) Date: Jan. 19, 2021

(87) PCT Pub. No.: WO2020/021820
PCT Pub. Date: Jan. 30, 2020

(65) Prior Publication Data
US 2021/0273943 A1   Sep. 2, 2021

(30) Foreign Application Priority Data

Jul. 25, 2018  (JP) .................................. 2018-139234

(51) Int. Cl.
*H04L 9/40*    (2022.01)
*G06F 21/45*   (2013.01)
(Continued)

(52) U.S. Cl.
CPC ............ *H04L 63/102* (2013.01); *G06F 21/45* (2013.01); *G06F 21/6245* (2013.01); *H04W 4/80* (2018.02); *H04W 12/08* (2013.01)

(58) Field of Classification Search
CPC ......... H04L 29/06; H04W 4/80; G06F 21/45; G06F 21/62
See application file for complete search history.

(56) References Cited

U.S. PATENT DOCUMENTS 10,149,136 B1 * 12/2018 Sathya .................. H04L 9/0816
10,257,683 B2 *  4/2019 Tokumoto ........... H04W 12/068
(Continued)

FOREIGN PATENT DOCUMENTS

JP   2008-59222 A    3/2008

OTHER PUBLICATIONS

International Search Report issued on Aug. 20, 2019 in PCT/JP2019/019154 filed on May 14, 2019.

*Primary Examiner* — Viral S Lakhia
(74) *Attorney, Agent, or Firm* — Oblon, McClelland, Maier & Neustadt, L.L.P.

(57) ABSTRACT

A user apparatus has a determiner configured to determine whether a relationship degree indicative of a degree of depth of relationship between a first user who manages the user apparatus and a second user who manages an external apparatus that is located within a predetermined range from the user apparatus is at or above a threshold; an acceptor configured to, when a determination result by the determiner is affirmative, accept an input of an instruction that permits lending to the second user a usage authorization to use a service that is available to the first user on the user apparatus; and a lender configured to, when the acceptor accepts the input of the instruction, provide the external apparatus with authorization information to enable the service to be used on the external apparatus.

20 Claims, 13 Drawing Sheets

(51) Int. Cl.
  *G06F 21/62* (2013.01)
  *H04W 4/80* (2018.01)
  *H04W 12/08* (2021.01)

(56) References Cited

U.S. PATENT DOCUMENTS

| | | | | |
|---|---|---|---|---|
| 11,157,608 | B2* | 10/2021 | Araki | H04L 63/10 |
| 11,323,450 | B2* | 5/2022 | Suzuki | H04L 63/102 |
| 11,436,348 | B2* | 9/2022 | Sato | H04L 63/0853 |
| 11,627,137 | B2* | 4/2023 | Chauhan | H04L 63/108 |
| | | | | 726/4 |
| 2019/0014078 | A1* | 1/2019 | Ranta | G06Q 50/01 |
| 2019/0043138 | A1* | 2/2019 | Blake | G06Q 20/102 |
| 2019/0327331 | A1* | 10/2019 | Natarajan | G06F 40/274 |
| 2021/0073399 | A1* | 3/2021 | Friedman | G06Q 30/0251 |
| 2021/0105259 | A1* | 4/2021 | Kiryu | H04L 63/08 |
| 2021/0234862 | A1* | 7/2021 | Wang | H04L 63/0892 |
| 2022/0075881 | A1* | 3/2022 | Koyama | G06F 21/6245 |
| 2022/0129533 | A1* | 4/2022 | Nagata | H04L 63/0846 |
| 2022/0156389 | A1* | 5/2022 | Aoki | G06F 21/31 |

* cited by examiner

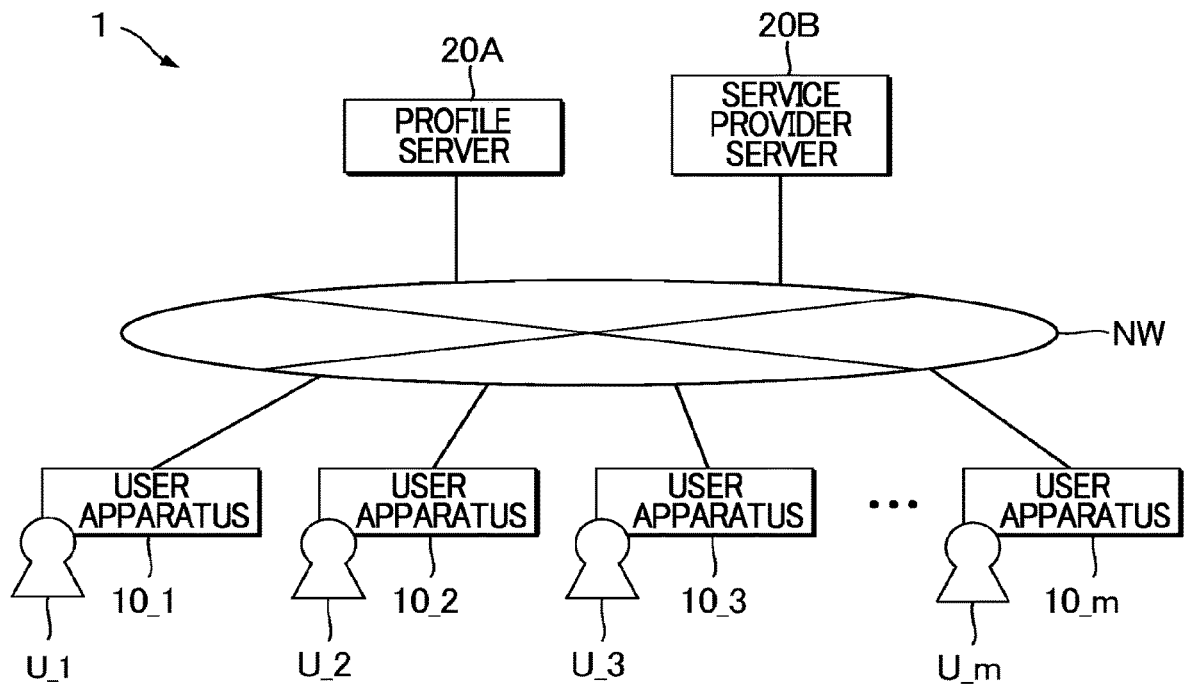
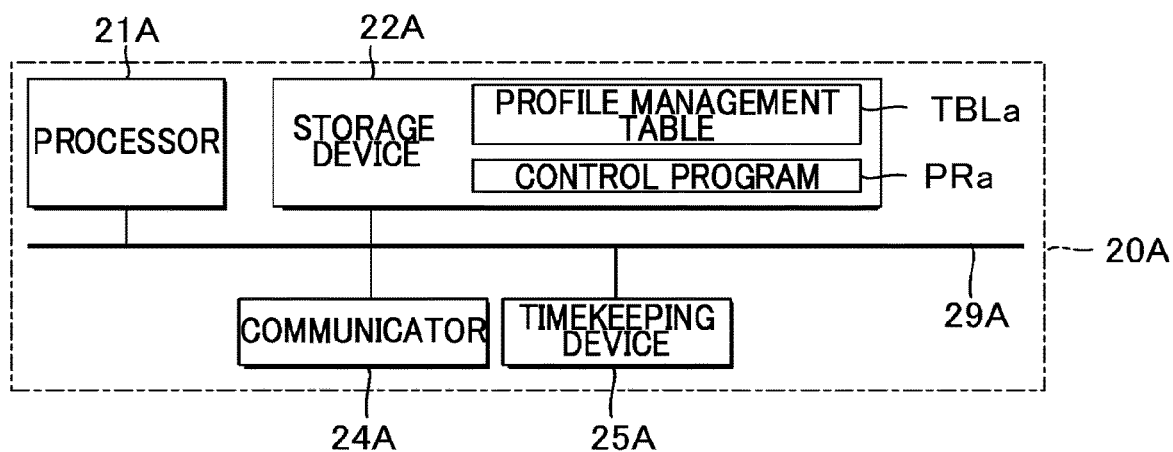

USER APPARATUS AND EXTERNAL APPARATUS

TECHNICAL FIELD

The present invention relates to a user apparatus and to an external apparatus.

BACKGROUND ART

In recent years, various services such as movie distribution via the Internet have become widespread. Users can use a service after receiving authentication from a service provider server. In Patent Document 1, the authorization for a user for using a service is made available to a friend's electronic device by transmitting identification ID that identifies an electronic device of the user and a public ID of the friend's electronic device from the user's electronic device to the service provider server, and then the service can be used on the friend's electronic device.

RELATED ART DOCUMENT

Patent

Patent Document 1 Japanese Patent Application Laid-Open Publication No. 2008-59222

SUMMARY OF THE INVENTION

Problem to be Solved by the Invention

However, in the conventional technique, users need to know their friends' public IDs for input into their electronic devices, and acquiring and entering the public IDs is time-consuming and does not allow for easy lending of authorization.

Means of Solving the Problems

In order to solve the above stated problem, a user apparatus according to a preferred aspect of the invention is a user apparatus capable of communicating with an external apparatus, and having a determiner configured to determine whether a relationship degree indicative of a degree of depth of relationship between a first user who manages the user apparatus and a second user who manages an external apparatus that is located within a predetermined range from the user apparatus is at or above a threshold; an acceptor configured to, when a determination result by the determiner is affirmative, accept an input of an instruction that permits lending to the second user a usage authorization to use a service that is available to the first user on the user apparatus; and a lender configured to, when the acceptor accepts the input of the instruction, provide the external apparatus with authorization information to enable the service to be used on the external apparatus.

Effect of the Invention

According to the user apparatus of the present invention, a candidate to whom a usage authorization to use a service is to be lent is a user of an external apparatus that is located within a predetermined range from the user apparatus and is a second user whose relationship degree with the first user is at or above a threshold. Moreover, the first user can lend the usage authorization to use a service to the second user simply by inputting an instruction permitting lending to the second user the usage authorization to use the service. Thus, the first user can easily lend the authorization to use the service to a trusted second user, while preventing impersonation.

BRIEF DESCRIPTION OF THE DRAWINGS

FIG. 1 is a block diagram showing an overall configuration of a service system according to a first embodiment of the present invention.

FIG. 2 is a block diagram illustrating a hardware configuration of a profile server used in the first embodiment.

MODES FOR CARRYING OUT THE INVENTION

1. First Embodiment

1.1. Configuration of Service System

Figure 3:
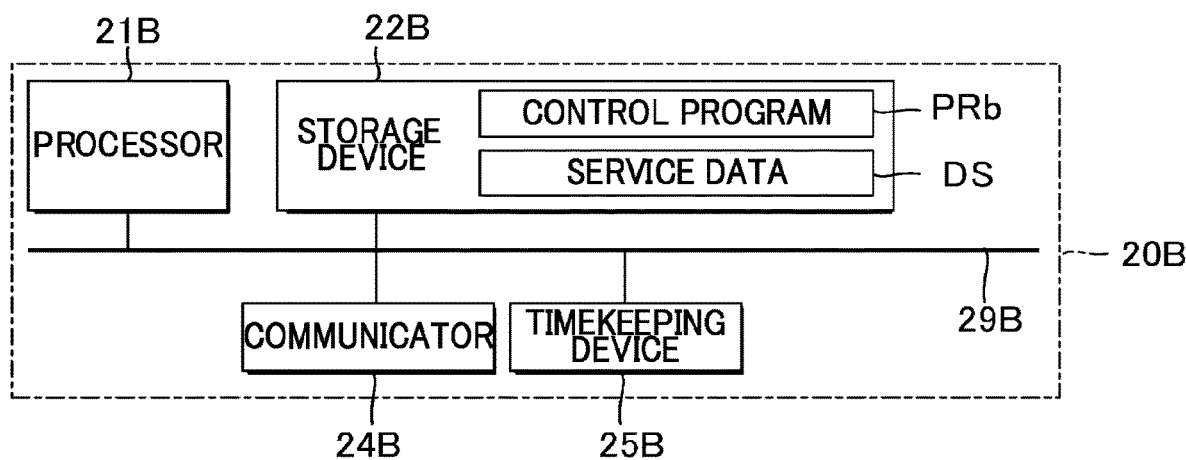
FIG. 3 is a block diagram illustrating a hardware configuration of a service provider server used in the first embodiment.

FIG. 1 is a block diagram illustrating an overall configuration of a service system according to a first embodiment of the present invention. The service system 1 shown in FIG. 1 provides a predetermined service. The service system 1 provides, for example, a movie distribution service, a digital terrestrial broadcast distribution service, a music distribution service, an e-book distribution service, or a photo processing service, as the predetermined service. The service system 1 allows a user U to lend usage authorization to use a service to another user U if predetermined conditions are met.

As illustrated in FIG. 1, the service system 1 is provided with user apparatuses 10_1 to 10_m (m is an integer equal to or greater than 2) managed by users U_1 to U_m, a network NW, a profile server 20A (management apparatus), and a service provider server 20B (service provider apparatus). In the following description, reference signs are used to distinguish between elements of the same kind, such as a user apparatus 10_1, a user apparatus 10_2, a user U_1, and a user U_2. When the same kind of elements are not distinguished, only the common number among the reference signs is used, such as a user apparatus 10, a user U, and so on. Furthermore, it is assumed that an element to which "_x" is assigned is an element related to a user U_x, where x is an integer from 1 to m. When the focus is on the user apparatus 10_1, the user apparatuses 10_2 to 10_m correspond to external apparatuses.

In the first embodiment, it is assumed that the user apparatus 10 is a portable terminal apparatus, such as a smartphone or a tablet terminal. However, any information processing apparatus can be employed as the user apparatus 10. For example, the user apparatus 10 may be a terminal-type information device, such as a personal computer.

The profile server 20A manages profiles of users U who manage user apparatuses 10. The profile server 20A generates a relationship degree indicating a depth of relationship between one user U and another user U based on the profile of the one user U and the profile of the other user U.

The service provider server 20B provides services of the service system 1 to users U. Furthermore, the service provider server 20B authenticates a user U when the user U logs in a service. The authentication of a user U is to confirm that a user U_x operating a user apparatus 10_x is a true user U_x himself and is not a third party impersonator.

1.1.1. Configuration of Profile Server

FIG. 2 is a block diagram illustrating a hardware configuration of the profile server 20A. The profile server 20A has a processor 21A, a storage device 22A, a communicator 24A, a timekeeping device 25A, and a bus 29A. The processor 21A, the storage device 22A, the communicator 24A, and the timekeeping device 25A are connected by the bus 29A for communicating information. The bus 29A may comprise a single bus or different buses for different elements.

The processor 21A is a processor that controls the entire profile server 20A and comprises, for example, a single chip or multiple chips. The processor 21A is constituted of, for example, an interface with peripheral devices and a central processing unit (CPU) that includes an arithmetic unit, registers, and the like. Some or all of the functions of the processor 21A can be performed by a digital signal processor (DSP), an application-specific integrated circuit (ASIC), a programmable logic device (PLD), a field programmable gate array (FPGA) or other hardware. The processor 21A executes various processes in parallel or sequentially.

The storage device 22A is a recording medium readable by the processor 21A, and stores a plurality of programs, including a control program PRa executed by the processor 21A, various data used by the processor 21A, and a profile management table TBLa. The storage device 22A is constituted of one or more types of, for example, a read only memory (ROM), an erasable programmable ROM (EPROM), an electrically erasable programmable ROM (EEPROM), a random access memory (RAM), and other storage circuits.

The profile management table TBLa stores user identification information UID and a profile in association with each other. The profile comprises attributes of a user U. The attributes are, for example, one or more of location information of a user apparatus 10, a cell identifier (ID) of a cell in which the user apparatus 10 is located, a communication history of the user apparatus 10, address book information of the user apparatus 10, connections with others in a social networking service (SNS) or contract information of the user apparatus 10. Some or all of these kinds of information are acquired from the user apparatus 10 or from a management server (not shown) that manages the information.

The user identification information UID is information that identifies a user U. In associating the user apparatus 10 with a user U who manages the user apparatus 10, the user identification information UID corresponds to device identification information that identifies the user apparatus 10. For example, the subscriber identity module ID (SIMID) of a subscriber identity module (SIM) card contained in the user apparatus 10 is both the 20 device identification information and the user identification information UID.

The communicator 24A is a device that communicates with other devices via the network NW, such as a mobile communication network or the Internet. The communicator 24A can be expressed also as a network device, a network controller, a network card or a communication module, for example. The communicator 24A is capable of communicating with, for example, the service provider server 20B and the user apparatuses 10 via the network NW.

The timekeeping device 25A generates date and time information indicative of a current date and time. Specifically, the date and time information is generated by counting a pulse signal acquired by dividing a clock signal generated by a crystal oscillator or the like.

1.1.2. Configuration of Service Provider Server

FIG. 3 is a block diagram illustrating a hardware configuration of the service provider server 20B. The service provider server 20B has a processor 21B, a storage device 22B, a communicator 24B, a timekeeping device 25B, and a bus 29B.

The processor 21B has the same configuration as the processor 21A, the storage device 22B as the storage device 22A, the communicator 24B as the communicator 24A, the timekeeping device 25B as the timekeeping device 25A, and the bus 29B as the bus 29A. The storage device 22B differs from the storage device 22A in that it stores a control program PRb and service data DS. The service data DS is video data if the service provided by the service provider server 20B is movie distribution or television broadcast distribution, music data if the service is music distribution, and still image data if the service is photo processing. The service data DS are managed on a content-by-content basis. For example, in the case of movie or television broadcast distribution, the service data DS are managed by title, and, in the case of music distribution, the service data DS are managed by a music track.

1.1.3. Configuration of User Apparatus

Figure 4:
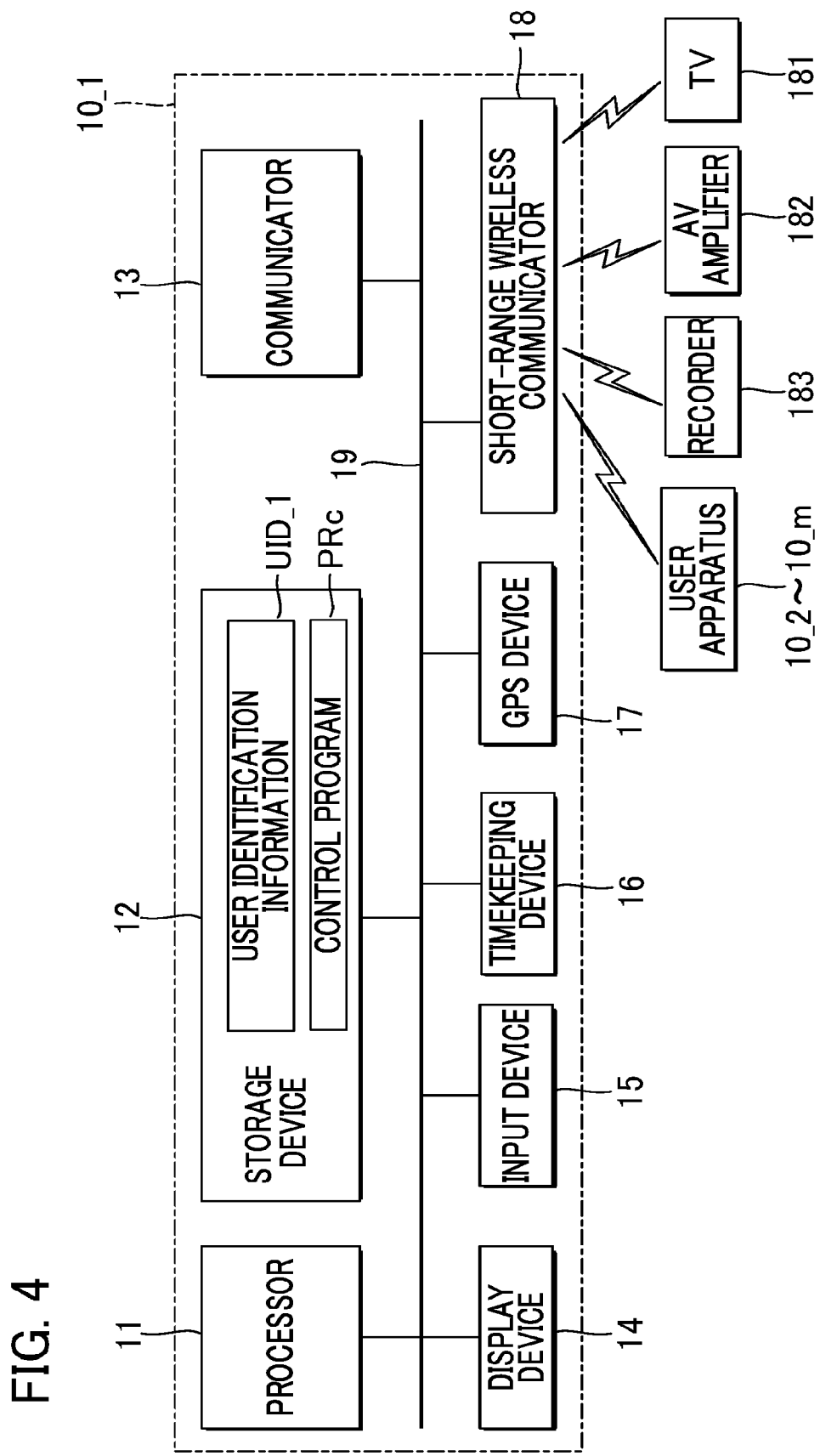
FIG. 4 is a block diagram illustrating a hardware configuration of a user apparatus used in the first embodiment.

FIG. 4 is a block diagram illustrating a hardware configuration of the user apparatus 10_1. In the following, the user apparatus 10_1 will be used as an example. Each of the user apparatuses 10_2 to 10_m, other than the user apparatus 10_1, has the same configuration as the user apparatus 10_1.

The user apparatus 10_1 is realized by a computer system with a processor 11, a storage device 12, a communicator 13, a display device 14, an input device 15, a timekeeping device 16, a global positioning system (GPS) device 17, a short-range wireless communicator 18, and a bus 19. The processor 11, the storage device 12, the communicator 13, the display device 14, the input device 15, the timekeeping device 16, the GPS device 17, and the short-range wireless communicator 18 are connected by the bus 19 for communicating information. The bus 19 may comprise a single bus or different buses for different elements. Each element of the user apparatus 10_1 may be constituted of a single device or multiple devices, and some elements of the user apparatus 10_1 may be omitted.

The processor 11 is a processor that controls the entire user apparatus 10_1 and is configured in the same manner as the processor 21A of the profile server 20A and the processor 21B of the service provider server 20B described above.

The storage device 12 is a recording medium readable by the processor 11. The storage device 12 stores a plurality of programs, one of which is a control program PRc executed by the processor 11. The storage device 12 stores user identification information UID_1, and various data used by the processor 11. The storage device 12 comprises one or more types of storage circuits, such as ROM, EPROM, EEPROM, RAM, and the like, similar to the storage device 22A described above. In this example, the SIMID is employed as the user identification information UID_1.

The communicator 13 is a device that communicates with other devices via a network NW, such as a mobile communication network or the Internet, and is configured in the same manner as the communicator 24A.

The display device 14 displays various images under control by the processor 11. For example, various display panels, such as liquid crystal display panels or organic electroluminescent (EL) display panels, are suitably used as the display device 14.

The input device 15 is a device for receiving input of information for use by the user apparatus 10_1. The input device 15 accepts operations carried out by the user. Specifically, the input device 15 accepts operations for inputting symbols such as numbers and letters, and operations for selecting one of the icons displayed by the display device 14. For example, a touch panel that detects contact with the display surface of the display device 14 is suitable as the input device 15. The input device 15 may include a plurality of operators operable by the user.

The timekeeping device 16 is a device that generates date and time information indicating a current date and time, and is configured in the same manner as the timekeeping device 25A.

The GPS device 17 receives radio waves from a plurality of satellites and generates location information from the received radio waves. The location information indicates the location of the user apparatus 10_1. The location information can be in any format as long as the location can be specified. The location information indicates, for example, the latitude and longitude of the user apparatus 10. In this example, the location information is acquired from the GPS device 17, but the user apparatus 10 may acquire the location information by any method. For example, the location information may be acquired using a cell ID assigned to a base station with which the user apparatus 10 communicates. Furthermore, when the user apparatus 10 communicates with an access point of a wireless local area network (LAN), the location information may be acquired by referring to a database in which identification address (media access control (MAC) address) on the network assigned to the access point and the actual residential address (location) of the access point are associated with each other.

The short-range wireless communicator 18 is a device that communicates with other devices by short-range wireless communication. The short-range wireless communication includes, for example, Bluetooth (registered trademark), ZigBee, or WiFi (registered trademark). The other devices include, for example, other user apparatuses 10_1 to 10_m, or a television receiver 181, an AV amplifier 182, a recorder 183, and the like managed by the user U_1.

Each element of the profile server 20A and the service provider server 20B may be constituted of a single device or multiple devices, and some elements of the profile server 20A and the service provider server 20B may be omitted.

1.2. Functions of First Embodiment

Figure 5:
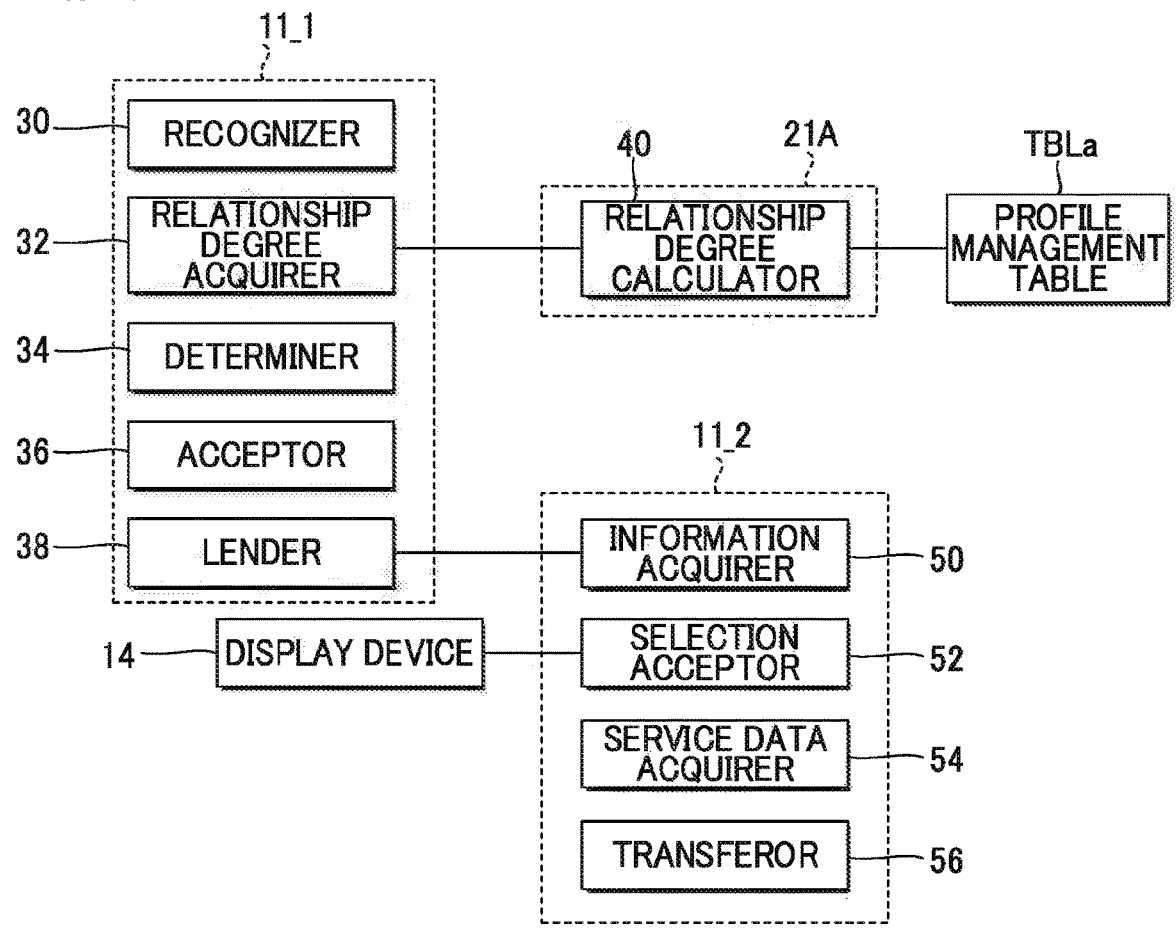
FIG. 5 is a functional block diagram illustrating functions of a service system of the first embodiment.

FIG. 5 is a functional block diagram showing functions of the user apparatus 10_1, the user apparatus 10_2, the profile server 20A, and the service provider server 20B. In the following description, the user U_1 of the user apparatus 10_1 is referred to as a first user U_1, and the user U_2 of the user apparatus 10_2 is referred to as a second user U_2. The user apparatus 10_2 corresponds to an external apparatus in relation to the user apparatus 10_1. It is assumed that a user apparatus 10 that is a lender of the service usage authorization is the user apparatus 10_1, and a user apparatus 10 that is a lendee of the service usage authorization is the user apparatus 10_2.

The first user U_1 has an authorization to use a service available at the user apparatus 10_1. The service is provided by the service provider server 20B, and is, for example, a movie distribution service. The user apparatus 10_1 can acquire service data DS from the service provider server 20B. The service data DS is, for example, movie data of a movie.

In the following description, the processor 11 of the user apparatus 10_1 is referred to as a processor 11_1 and the processor 11 of the user apparatus 10_2 is referred to as a processor 11_2.

1.2.1. Functions of Lender User Apparatus

The processor 11_1 reads and executes the control program PRc from the storage device 12 and functions as a recognizer 30, a relationship degree acquirer 32, a determiner 34, an acceptor 36, and a lender 38.

The recognizer 30 recognizes another user apparatus 10 that is located within a predetermined range from the user apparatus 10_1. The predetermined range can be a range determined in advance and is not limited to a range of equal distances around the user apparatus 10_1. The predetermined range may be a range within which the reception strength of the short-range wireless communication at the user apparatus 10_1 is at a predetermined level or greater. Specifically, the recognizer 30 uses the short-range wireless communicator 18 to recognize a user apparatus 10 with reception strength of a predetermined level or greater.

Each user apparatus 10_1 to 10_m broadcasts a beacon signal including the user identification information UID in short-range wireless communication at a predetermined cycle. The recognizer 30 recognizes which one or more of the user apparatuses 10_2 to 10_m is or are within the predetermined range from the user apparatus 10_1 by receiving beacon signals transmitted from the user apparatuses 10_2 to 10_m. The user apparatuses 10_2 to 10_m each correspond to an external apparatus. For example, it is assumed that the reception strength of a beacon signal received from another user apparatus 10 located only 0.5 meters away from the user apparatus 10_1 is first reception strength, and that the reception strength of a beacon signal received from another user apparatus 10 located 10 meters away from the user apparatus 10_1 is second reception strength. In this case, it is preferable that the predetermined level be defined to be the first reception strength at most and the second reception strength at least. When the predetermined level is set within this range, a user apparatus 10 that is located within an area that can be looked over by the first user U_1 who carries the user apparatus 10_1, which is the lender of the usage authorization, can be a candidate for the lendee. As a result, the security is improved because a user U who is nearby can be a lendee of the usage authorization.

The relationship degree acquirer 32 acquires from the profile server 20A a degree of relationship indicating the degree of depth of relationship between the first user U_1 managing the user apparatus 10_1 and the user U_y of the user apparatus 10_y recognized by the recognizer 30. It is of note that "y" is an integer satisfying 2≤y≤m.

Specifically, the relationship degree acquirer 32 transmits the user identification information UID_1 of the first user U_1, who manages the user apparatus 10_1, and the user identification information UID_y of the user U_y, who manages the user apparatus 10_y recognized by the recognizer 30, to the profile server 20A. The relationship degree acquirer 32 then receives from the profile server 20A a relationship degree generated at the profile server 20A based on the user identification information UID_1 and the user identification information UID_y. For example, if the user apparatus 10_2 and the user apparatus 10_3 are recognized by the recognizer 20 as being within the predetermined range from the user apparatus 10_1, the relationship degree acquirer 32 acquires the user identification information UID_1, the user identification information UID_2, and the user identification information UID_3 by separating each of them from the respective beacon signals, and then transmits the acquired user identification information to the profile server 20A. The profile server 20A transmits to the user apparatus 10_1 a relationship degree generated 20 based on the user identification information UID_1 and the user identification information UID_2, and a relationship degree generated based on the user identification information UID_1 and the user identification information UID_3.

The determiner 34 determines whether the relationship degree indicating the degree of depth of relationship between the first user U_1 managing the user apparatus 10_1 and the user U_y of the user apparatus 10_y recognized by the recognizer 30 is at or above a threshold. If a result of the determination by the determiner 34 is negative, the lending of authorization to use the service is not executed.

When a result of the determination by the determiner 34 is affirmative, the acceptor 36 accepts an input of an instruction permitting lending, to the user U_y whose relationship degree is at the threshold or higher, of an authorization to use a service available to the first user U_1 at the user apparatus 10_1. Specifically, the acceptor 36 accepts an input from the first user U_1 by displaying an image on the display device 14 from which image it is possible for the first user U_1 to select a user apparatus 10_y managed by the user U_y whose relationship degree is at or above the threshold. For example, when the degree of relationship between the second user U_2 of the user apparatus 10_2 and the first user U_1, and the degree of relationship between the third user U_3 of the user apparatus 10_3 and the first user U_1 are at or above the threshold, the acceptor 36 causes a screen shown in FIG. 6 to be displayed on the display device 14. In this example, there are displayed on the display device 14 a button B1 indicating the user identification information UID_2 of the second user U_2 and a button B2 indicating the user identification information UID_3 of the third user U_3, who manages the user apparatus 10_3. When the first user U_1 presses the button B1 or the button B2, the instruction to permit lending of the usage authorization is input.

In this example, user identification information UID is displayed on the screen of the display device 14. However, an image associated with the user identification information UID may be displayed. Such an image may include a name, a nickname, or an avatar. In this case, a table that stores a plurality of pairs of user identification information UID and image data indicating the above image in association with each other can be stored in the storage device 12, and an image that corresponds to the user identification information UID can be displayed on the display device 14 by referring to the table.

When the acceptor 36 accepts an input of an instruction, and when a user apparatus 10 specified by the first user U_1 is an external apparatus, e.g., the user apparatus 10_2, the lender 38 then provides to the external apparatus authorization information that enables the service to be used in the external apparatus. Specifically, the lender 38 establishes, by use of the short-range wireless communicator 18, a short-range wireless connection with the user apparatus 10 for which an instruction is accepted by the acceptor 36, and then transmits a service authorization lending notice to the user apparatus 10, which is the lendee.

For example, the service authorization lending notice includes the user identification information UID_1 of the lender and authorization information. The authorization information is information that enables the service to be used at a lendee user apparatus 10. In this example, the authorization information are service identification information SID1 and a password PAS1 required for the first user U_1 who is the lender to receive the service. For security reasons, it is preferable that the authorization information be encrypted.

1.2.2. Functions of Profile Server

The processor 21A of the profile server 20A functions as a relationship degree calculator 40, which is realized by reading and executing the control program PRa from the storage device 22A. Upon receiving the user identification information UID_1 of the first user U_1 managing the user apparatus 10_1 and the user identification information UID_y of the user U_y managing the user apparatus 10_y recognized by the recognizer 30, the relationship degree calculator 40 calculates a degree of relationship between the first user U_1 and the user U_y based on profiles of the first user U_1 and user U_y. The profiles are acquired by referring to the profile management table TBLa and acquiring a profile that corresponds to the user identification information UID_1 and a profile that corresponds to the user identification information UID_y. The relationship degree calculator 40 then transmits the calculated degree of relationship between the first user U_1 and the user U_y to the user apparatus 10_1.

As described above, the profile can include location information, a cell ID, communication history, address book information, connections with others in SNS, contract information of the user apparatus 10, or the like. The relationship degree calculator 40 calculates a relationship degree using, for example, an evaluation function using various elements of the profile as variables. The relationship degree calculator 40 may specify an evaluation value for each item, in such a way that, for example, if the location information after 10:00 p.m. is almost the same for the first user U_1 and the user U_y, the users are likely to be relatives living in the same household, and therefore, the user U_y has an evaluation value of "5"; if the cell ID during the daytime hours matches between the two users, the user U_y is likely to be a colleague or classmate, and therefore has an evaluation value of "3"; an evaluation value of "3" if the frequency of communication in the communication history between the two users is higher than a predetermined value; an evaluation value of "2" if the user U_y is in the address book; an evaluation value of "2" for a social network friendship; and an evaluation value of "6" if it is clear from the contract information that the user U_y is a relative living in the same household, and so on, and calculate the sum of these values as a confidence degree.

1.2.3. Functions of Lendee User Apparatus

Next, the processor 11_2 of the user apparatus 10_2 functions as an information acquirer 50, a selection acceptor 52, a service data acquirer 54, and a transferor 56, which are realized by reading and executing the control program PRc from the storage device 12. As described above, the user apparatus 10_2 is the lendee of the usage authorization.

The information acquirer 50 acquires authorization information contained in the service authorization lending notice by use of the short-range wireless communicator 18.

Figure 7:
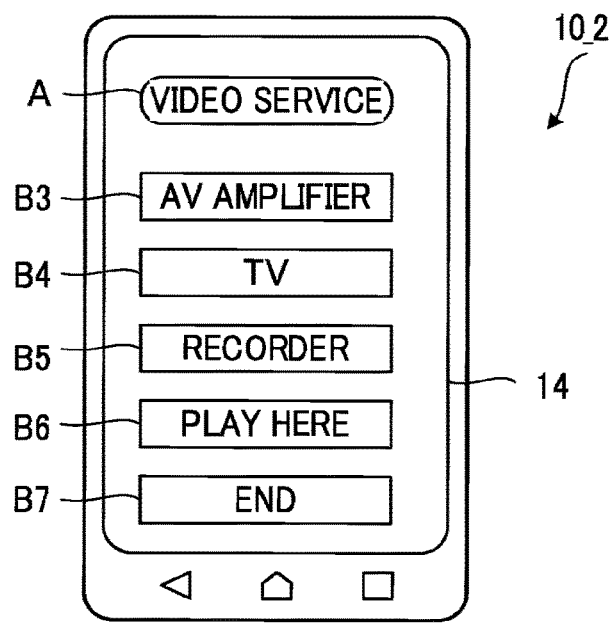
FIG. 7 is an explanatory diagram showing an example of a screen for an operation of a selection acceptor of the first embodiment.

Upon acquiring the authorization information from the user apparatus 10_1, the selection acceptor 52 displays one or more devices capable of short-range wireless connection with the user apparatus 10_2 on the display device 14 (display unit), to accept a selection by the second user U_2 of one of the one or more devices. For example, when the devices capable of short-range wireless connection with the user apparatus 10_2 are a television receiver 181, an AV amplifier 182, and a recorder 183 capable of recording, the selection acceptor 52 displays a screen such as shown in FIG. 7 on the display device 14 and prompts the second user U_2 to make a selection. In this example, the content of the service to be lent is displayed in a region A, with a button B3 to which the AV amplifier is assigned, a button B4 to which the television receiver is assigned, and a button B5 to which the recorder is assigned. The destination of the service data DS is specified by the second user U_2 pressing one of the buttons B3 to B5. When the second user U_2 presses the button B6, the service data DS is not transferred and the service data DS is played back at the user apparatus 10_2 without the service data DS being transferred. When the second user U_2 presses the button B7, the process ends without acquiring the service data DS from the service provider server 20B. Therefore, when the second user U_2 does not wish the service to be provided, the user identification information UID_2 is not recognized by the service provider server 20B because an authentication request described below is not transmitted to the service provider server 20B. Therefore, personal information of the second user U_2 can be protected.

The service data acquirer 54 shown in FIG. 5 transmits authorization information to the service provider server 20B and acquires the service data DS from the service provider server 20B. Specifically, the service data acquirer 54 transmits an authentication request to the service provider server 20B. The authentication request includes the user identification information UID_1 of the first user U_1, who is the lender, the user identification information UID_2 of the second user U_2, who is the lendee, and authorization information. The authorization information includes the service identification information SID1 and the password PAS1, as described above. Upon receiving the authentication request, the service provider server 20B performs an authentication process for the provision of the service based on the authorization information. The service provider server 20B recognizes that the usage authorization to use the service has been lent from the first user U_1 to the second user U_2, based on the user identification information UID_1 and the user identification information UID_2.

The transferor 56 transfers the service data DS acquired by the service data acquirer 54 to the device, a selection of which has been accepted at the selection acceptor 52. For example, if the second user U_2 presses the button B4 in the screen shown in FIG. 7, the service data DS is transferred to the television receiver 181.

Figure 8:
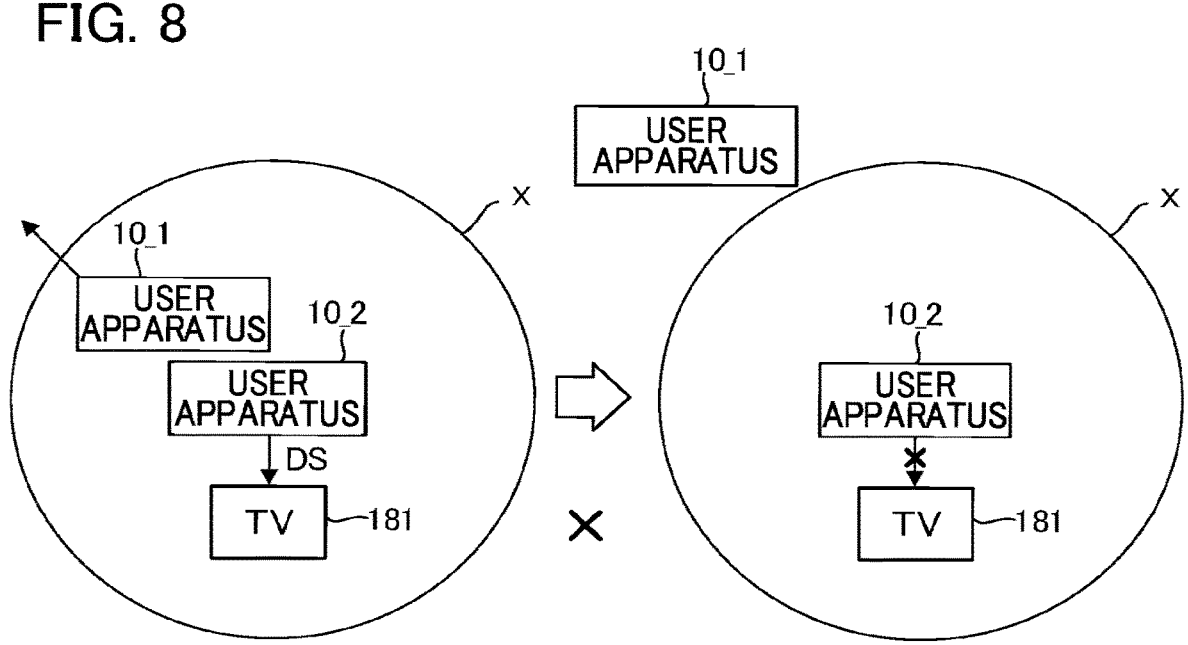
FIG. 8 is an explanatory diagram for explaining completion of service data transfer in the first embodiment.

The transferor 56 monitors the short-range wireless connection between the lender user apparatus 10_1 and the lendee user apparatus 10_2, and when the short-range wireless connection is disconnected, the transferor 56 terminates the transfer of the service data DS. For example, in FIG. 8, it is assumed that a range within which the short-range wireless connection between the user apparatus 10_2 and the user apparatus 10_1 is possible is a communication range X, and that the positional relationship between the user apparatus 10_2 and the user apparatus 10_1 changes from the state shown on the left of FIG. 8 to the state shown on the right. In the state shown on the left of FIG. 8, because the user apparatus 10_1 is located in the communication range X, the service data DS is transferred from the user apparatus 10_2 to the television receiver 181. When, starting from this state, the first user U_1 moves out of the communication range X while carrying the user apparatus 10_1, the wireless communication between the user apparatus 10_1 and the user apparatus 10_2 is disconnected. In this case, the transfer of the service data DS from the user apparatus 10_2 to the television receiver 181 is terminated.

Thus, when the lendee user apparatus 10_2 receives a service authorization lending notice, the second user U_2 can select a device to which the service data DS is to be transferred, so that the content can be played on the device desired by the second user U_2. Furthermore, it is also possible to play the content on the user apparatus 10_2.

1.3. Operation of First Embodiment

Figure 9:
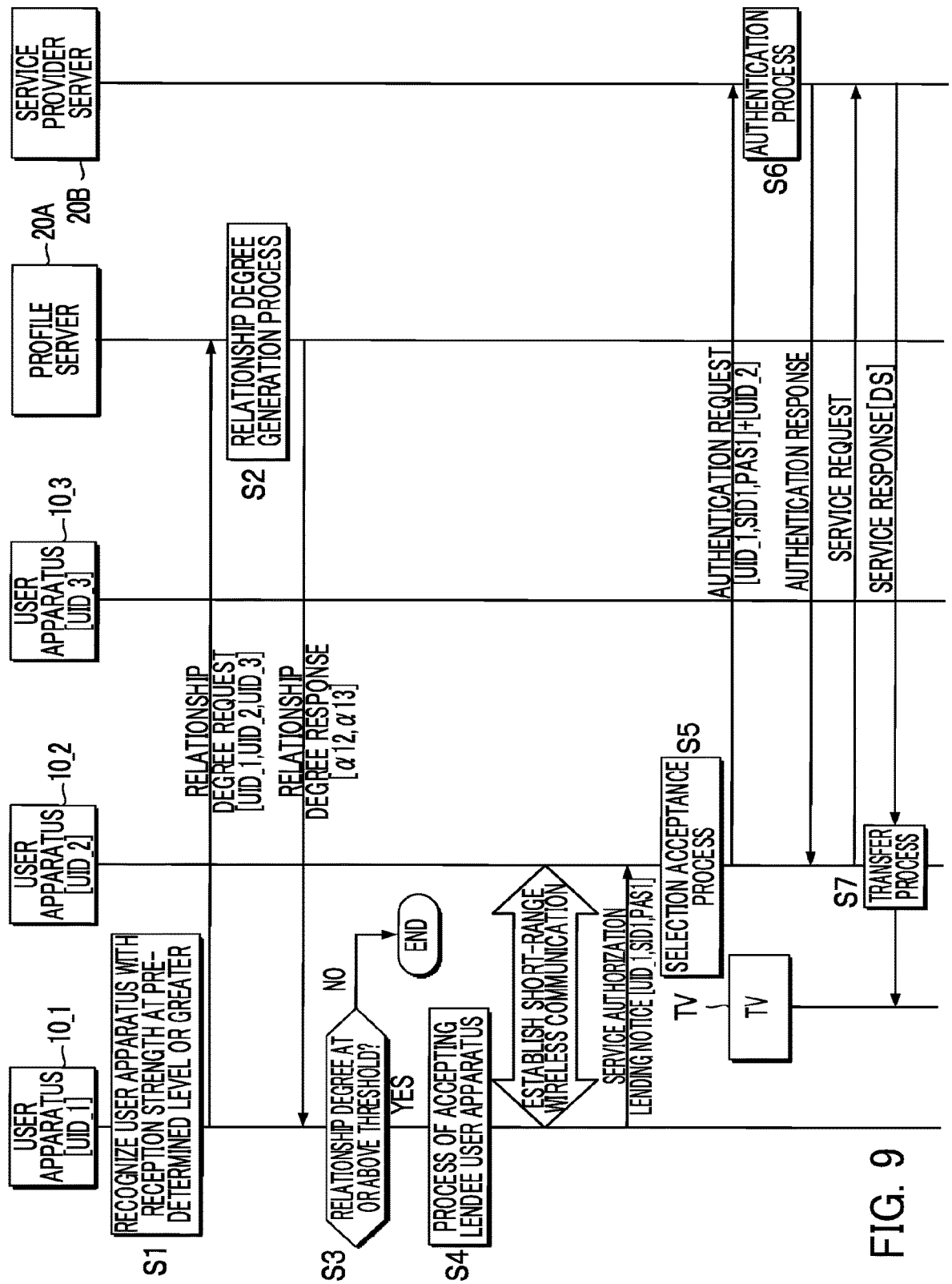
FIG. 9 is a sequence chart illustrating an operation of the service system of the first embodiment.

The operation of the first embodiment will now be described with reference to FIG. 9. FIG. 9 is a sequence chart illustrating an operation of the service system 1 in the first embodiment. In this example, a user U who is the lender of the service usage authorization is the first user U_1 managing the user apparatus 10_1, and a user U who is the lendee of the service usage authorization is the second user U_2 managing the user apparatus 10_2.

First, the recognizer 30 of the lender user apparatus 10-1 recognizes a user apparatus 10 whose reception strength is at a predetermined level or greater by use of the short-range wireless communicator 18 (S1). The user apparatus 10 recognized by the recognizer 30 will be a candidate for a lendee of the service usage authorization. A user apparatus 10 having reception strength at the predetermined level or greater is selected as a candidate for the lendee in order to lend the service usage authorization to other users who are near the first user U_1, thus limiting to a user apparatus 10 that is located within a range which the first user U_1 can look over, for example. By limiting the lendee user apparatus 10 in terms of location, it is possible to prevent or reduce impersonation. In the following explanation, it is assumed in step S1 that the user apparatus 10_2 and the user apparatus 10_2 are located within the predetermined range from the lender user apparatus 10_1, and that the user apparatus 10_2 and the user apparatus 10_3 will be the candidate user apparatuses 10 for the lendee.

Next, the relationship degree acquirer 32 of the lender user apparatus 10-1 transmits a relationship degree request to the profile server 20A. The relationship degree request includes the user identification information UID_1 of the first user U_1, who is the lender, and user identification information UID_2 and UID_3 acquired from the user apparatuses 10_2 and 10_3, which are candidates for the lendee.

Next, when the profile server 20A receives the relationship degree request, the relationship degree calculator 40 executes a relationship degree calculation process (S2), to generate a relationship degree α12 between the lender first user U_1 and the second user U_2, who is a candidate lendee, and a relationship degree α13 between the lender first user U_1 and the third user U_3, who is a candidate lendee. The relationship degree calculator 40 replies with a relationship degree response including the relationship degree α12 and the relationship degree α13 to the lender user apparatus 10_1.

Next, the determiner 34 of the lender user apparatus 10_1 determines whether each of the relationship degrees α12 and α13 included in the relationship degree response is at the threshold or above (S3). In this example, it is assumed that the relationship degree α12 at the threshold or above and the relationship degree α13 is at the threshold or above. Therefore, the user apparatus 10_2 and the user apparatus 10_3 will be candidates for the lendee of the usage authorization. If the relationship degree α12 is below the threshold and the relationship degree α13 is below the threshold, the lending of the usage authorization is not executed, and the process ends.

Figure 6:
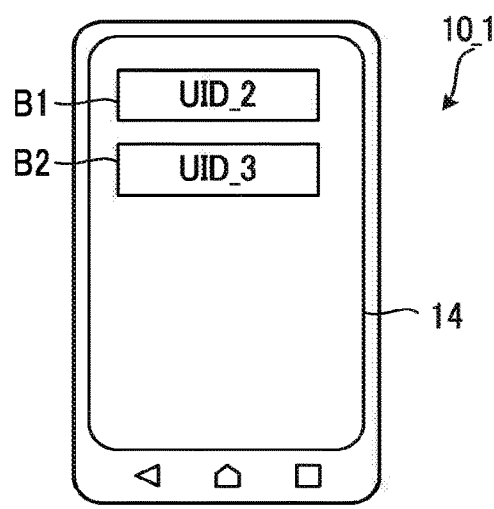
FIG. 6 is an explanatory diagram showing an example screen for an operation of an acceptor of the first embodiment.

Next, the acceptor 36 of the lender user apparatus 10_1 displays on the display device 14 the selection screen shown in FIG. 6 described above, to accept an input of an instruction permitting lending of the usage authorization of the service available at the user apparatus 10_1 to the second user U_2 or the third user U_3 (S4). In this example, it is assumed that the first user U_1 presses the button B1 shown in FIG. 6 and enters an instruction to permit lending of the usage authorization to the second user U_2.

After this, the lender 38 of the lender user apparatus 10_1 establishes a short-range wireless communication with the user apparatus 10_2 and transmits a service authorization lending notice to the user apparatus 10_2. The service authorization lending notice includes authorization information that enables the service to be used at the user apparatus 10_2.

Next, upon receiving the service authorization lending notice from the user apparatus 10_1 and acquiring the authorization information contained in the service authorization lending notice, the selection acceptor 52 of the user apparatus 10_2 displays one or more devices capable of short-range wireless connection with the user apparatus 10_2 on the display device 14, thereby executing a selection acceptance process for accepting a selection by the second user U_2 (S5). Here, the short-range wireless includes Bluetooth, ZigBee, or WiFi, but since this short-range wireless is used for communication of the service data DS, it is preferable that the WiFi is capable of transmitting videos and the like in real time. That is, for transferring the service data DS, it is preferable to use a short-range wireless communication, which has a higher transfer rate than the short-range wireless communication used for transmitting the service authorization lending notice from the user apparatus 10_1 to the user apparatus 10_2. In the following description, it is assumed that in the selection acceptance process, for example, the selection screen shown in FIG. 7 is displayed on the display device 14, and the second user U_2 presses the button B4 to select the television receiver 181.

Next, the service data acquirer 54 of the user apparatus 10_2 transmits an authentication request to the service provider server 20B. The authentication request includes the authorization information [SID1, PAS1] included in the service authorization lending notice, the user identification information UID_1 of the first user U_1, who is the lender, and the user identification information UID_2 of the second user U_2, who is the lendee. The user apparatus 10_2 merely transmitting the service identification information SID1 and the password PAS1 to the service provider server 20B does not allow the service provider server 20B to determine whether the authentication request is from the first user U_1 or from the user apparatus 10_2, who is the lendee. However, since the authentication request of this embodiment includes the user identification information UID_1 of the lender and the user identification information UID_2 of the lendee, the service provider server 20B is able to know that the lending of usage authorization has been executed from the first user U_1 to the second user U_2.

Next, upon receiving the authentication request, the service provider server 20B executes an authentication process based on the authorization information included in the authentication request (S6). If the authorization information is valid, the service provider server 20B replies to the user apparatus 10_2 with an authentication response indicating a successful authentication, and if the authorization information is invalid, the service provider server 20B replies to the user apparatus 10_2 with an authentication response indicating an authentication failure. In the following description, it is assumed that the authentication is successful.

Next, the service data acquirer 54 of the user apparatus 10_2 transmits a service request to the service provider server 20B. The service request includes specification information specifying service data DS that the second user U_2 wishes to have delivered. Upon receiving the service request, the service provider server 20B transmits a service response including the service data DS specified by the specification information to the user apparatus 10_2.

Next, when the service data acquirer 54 of the user apparatus 10_2 acquires the service data DS included in the service response, the transferor 56 executes a transfer process of transferring the acquired service data DS to the television receiver 181 (S7).

As explained above, in the service system 1 of the first embodiment, the user apparatus 10_1, which is the lender, has a determiner 34 that determines whether the relationship degree, which indicates the degree of depth of the relationship between the first user U_1 and the second user U_2, is at a threshold or above when the user apparatus 10_2 (an external apparatus) is located within a predetermined range. Furthermore, the user apparatus 10_1 includes an acceptor 36 that accepts an input of an instruction permitting lending, by the first user U_1, of the authorization to use a service available at the user apparatus 10_1 to the second user U_2 when a result of the determination by the determiner 34 is affirmative; and a lender 38 that provides, to the user apparatus 10_2, authorization information for enabling the service to be used by the user apparatus 10_2, when the acceptor 36 accepts the input of the instruction.

According to the user apparatus 10_1, since another user apparatus 10 located within a predetermined range from the user apparatus 10_1 is a candidate for the lendee, it is possible to lend the usage authorization of the service to a user U who is within a certain distance from the first user U_1. As a result, the lending of the authorization can be limited to a nearby user U, and then the user U, who is the lender, can lend the authorization after confirming that the user U is an acquaintance of the user.

In addition, since candidate users for the lendee are limited to those whose degree of relationship is at or above a threshold, it is possible to prevent an unknown user from becoming a candidate for the lendee, for example, when lending usage authorization in a place where an unspecified number of people are gathered (e.g., a café). Therefore, according to the user apparatus 10_1, it is possible to easily lend the authorization to use the service to a trusted second user while preventing impersonation.

In the first embodiment, the lender user apparatus 10_1 has a relationship degree acquirer 32 that, when another user apparatus 10 located within a predetermined range from the user apparatus 10_1 is the user apparatus 10_2 of the second user U_2, transmits to the profile server 20A (management apparatus) the user identification information UID_1 (first user identification information) identifying the first user U_1, and the user identification information UID_2 (second user identification information) identifying the user U_2, and that receives from the profile server 20A a relationship degree generated based on the user identification information UID_1 and the user identification information UID_2 at the profile server 20A. Therefore, the user apparatus 10_1 does not need to calculate the relationship degree, whereby the processing load of the user apparatus 10_1 is reduced.

In the first embodiment, the lender 38 of the lender user apparatus 10_1 provides an authorization lending notice including authorization information and the user identification information UID_1 (first user identification information) identifying the first user U_1, to another user apparatus 10, which is an external apparatus. The authorization information is information that relates to the authentication required for the first user U_1 to use the service. Accordingly, the lendee user apparatus 10 can receive authentication of the service provider server 20B, using the authorization information. Also, by notifying the service provider server 20B of the user identification information UID_1 of the lender, the service provider server 20B can recognize that the authorization to use the service has been lent.

In the first embodiment, the lendee user apparatus 10 (e.g., user apparatus 10_2), which is an external apparatus, has a display device 14 (display unit) that displays images; a selection acceptor 52 that, by displaying, upon acquiring authorization information from the lender user apparatus 10_1, one or more devices capable of short-range wireless connection with the lendee user apparatus 10 on the display device 14, accepts a selection of one of the one or more devices by a user U (e.g., second user U_2) who is the lendee; and a transferor 56 that transfers the service data DS to the device, the selection of which has been accepted by the selection acceptor 52, upon acquiring the service data DS from the service provider server 20B (service provider apparatus) in response to transmission of the authorization information to the service provider server 20B, which provides the service.

According to the lendee user apparatus 10, the user U, who is the lendee, can select the device on which to play the service data DS, so that the user can use the service data DS more effectively as compared with a case in which the destination of the service data DS is limited to the user apparatus 10 of the lendee.

In the first embodiment, the lendee user apparatus 10 (e.g., user apparatus 10_2), which is an external apparatus, and the lender user apparatus 10_1 are connected by a short-range wireless connection, and the transferor 56 terminates the transfer of the service data DS when the short-range wireless connection between the lendee user apparatus 10, which is the external apparatus, and the lender user apparatus 10_1 are disconnected. That is, when the lender user apparatus 10_1 and the lendee user apparatus 10 are separated by a predetermined distance, the short-range wireless connection will be disconnected. When a user U, who is the lender, is separated from a user U, who is the lendee, the lendee user U may use the service just as desired, without restraint by the lender user U. According to the lendee user apparatus 10, when the lender user apparatus 10_1 is separated from the lendee user apparatus 10 by a predetermined distance and the short-range wireless connection is disconnected, the transfer of the service data DS is terminated, thus preventing or reducing the unlimited use of the service on the lendee user apparatus 10.

2. Second Embodiment

In the service system 1 according to the first embodiment, the relationship degree is generated by the profile server 20A. In contrast, in the service system 1 according to the second embodiment, the relationship degree is generated by the user apparatus 10. The hardware of the service system 1 in the second embodiment is the same as that of the service system 1 in the first embodiment, but the functions are different.

2.1. Functions of Second Embodiment

Figure 10:
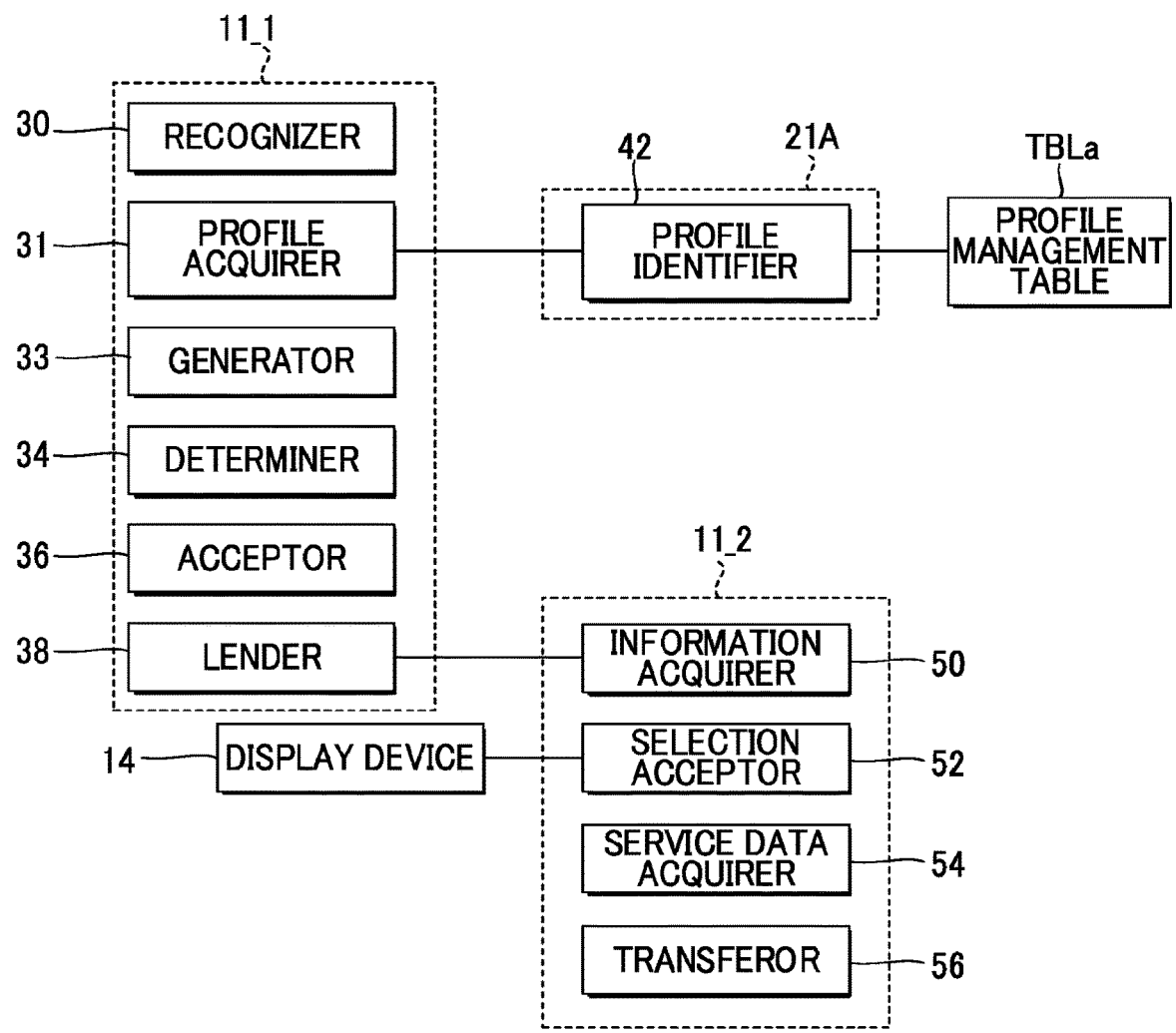
FIG. 10 is a functional block diagram showing functions of a service system of a second embodiment.

FIG. 10 is a functional block diagram showing the functions of the lender user apparatus 10_1, the lendee user apparatus 10_2, the profile server 20A, and the service provider server 20B. The same reference signs are assigned to the same elements as those in FIG. 5, and description thereof is omitted.

The processor 11_1 of the lender user apparatus 10_1 differs from that in the first embodiment in that the processor 11_1 has a profile acquirer 31 and a generator 33 in place of the relationship degree acquirer 32 (see FIG. 5). The profile acquirer 31 transmits to the profile server 20A (management apparatus) a profile request including user identification information UID_1 identifying a first user U_1 and user identification information UID_2 identifying a second user U_2. The profile acquirer 31 receives a profile response including profile information P1 (first profile information) and profile information P2 (second profile information) from the profile server 20A. The profile information P1 indicates a profile of the first user U_1 managed in association with the user identification information UID_1 in the profile server 20A, and the profile information P2 indicates a profile of the second user U_2 managed in association with the user identification information UID_2 in the profile server 20A.

The generator 33 generates a relationship degree based on the profile information P1 and the profile information P2. That is, the generator 33 corresponds to the relationship degree calculator 40 of the first embodiment.

2.2. Operation of Second Embodiment

Figure 11:
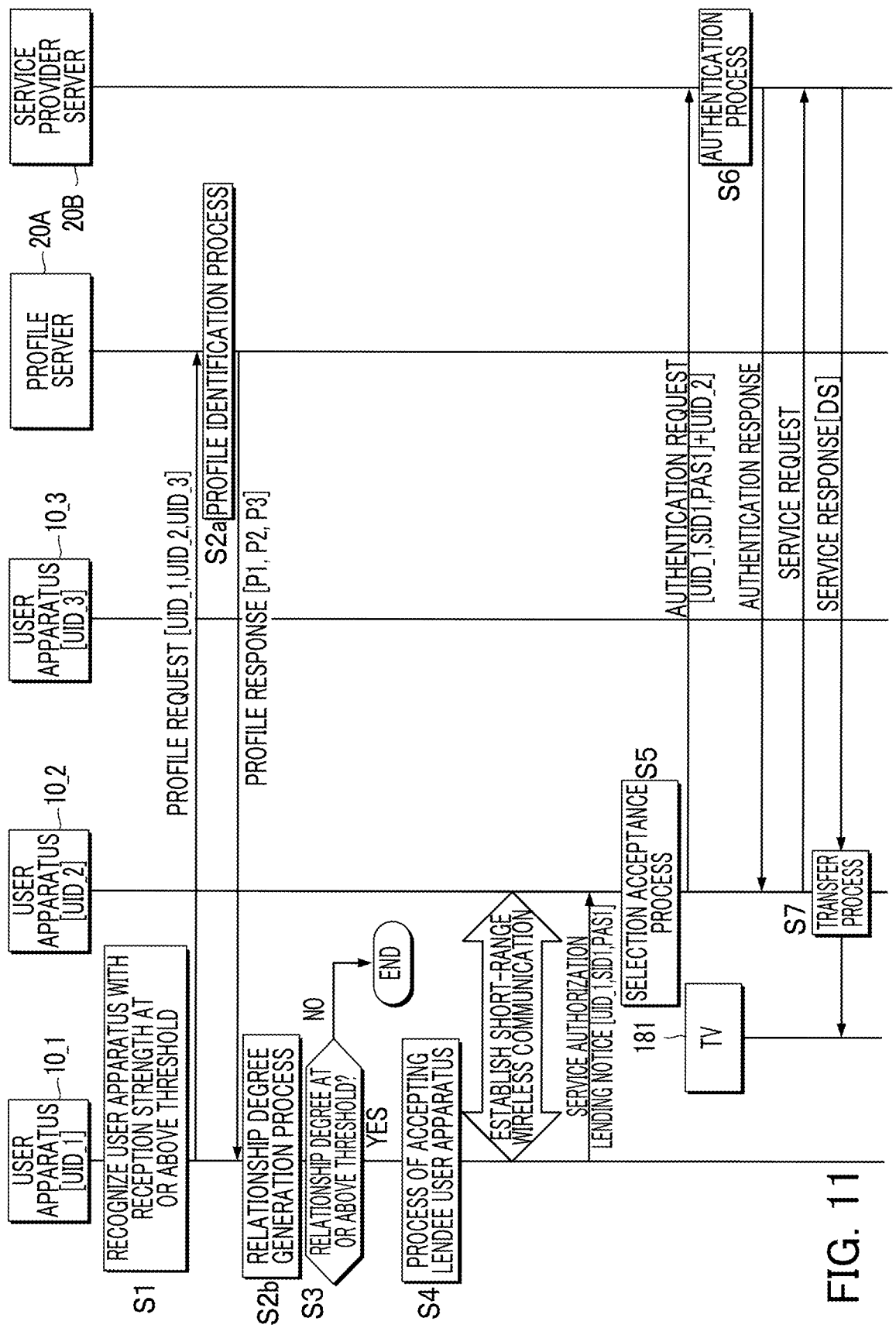
FIG. 11 is a sequence chart illustrating an operation of the service system of the second embodiment.

Next, referring to FIG. 11, an operation of the second embodiment will be described. FIG. 11 is a sequence chart illustrating the operation of the service system 1 in the second embodiment. In this example, a user U who is the lender of the service usage authorization is a first user U_1 managing the user apparatus 10_1, and a user U who is the lendee of the service usage authorization is a second user U_2 managing the user apparatus 10_2. In FIG. 11, operations similar to those of the first embodiment are assigned the same reference signs, and description thereof is omitted.

First, the recognizer 30 of the lender user apparatus 10-1 recognizes the user apparatus 10 in which reception strength is at a predetermined level or greater by use of the short-range wireless communicator 18 (S1). In this example, similarly to the first embodiment, the user apparatus 10_2 and the user apparatus 10_3 will be candidate lendee user apparatuses 10.

The profile acquirer 31 transmits a profile request to the profile server 20A. The profile request includes the user identification information UID_1 of the first user U_1 who manages the lender user apparatus 10_1, the user identification information UID_2 of the second user U_2 who manages a candidate lendee user apparatus 10_2, and the user identification information UID_3 of a third user U_3 who manages a candidate lendee user apparatus 10_3.

Next, when the profile server 20A receives the profile request, the profile identifier 42 executes a profile identification process (S2a). Specifically, the profile identifier 42 generates profile information P1 of the first user U_1, who is the lender, profile information P2 of the second user U_2, who is a candidate lendee, and profile information P3 of the third user U_3, who is a candidate lendee. The profile identifier 42 replies with a profile response including the profile information P1, P2, and P3 to the lender user apparatus 10_1. The profile response is preferably encrypted in view of protecting personal information.

Next, when the generator 33 of the lender user apparatus 10_1 receives the profile response, the generator 33 generates a relationship degree α12 between the first user U_1 and the second user U_2 based on the profile information P1 and the profile information P2, and generates a relationship degree α13 between the first user U_1 and the third user U_3 based on the profile information P1 and the profile information P3. The subsequent process from step S3 on is the same as the operation of the first embodiment described with reference to FIG. 10.

According to the service system 1 of the second embodiment, the processing load for calculating the relationship degree is divided because the calculation of the relationship degree is performed at the lender user apparatus 10_1. As a result, the processing load of the profile server 20A can be reduced.

3. Third Embodiment

Figure 12:
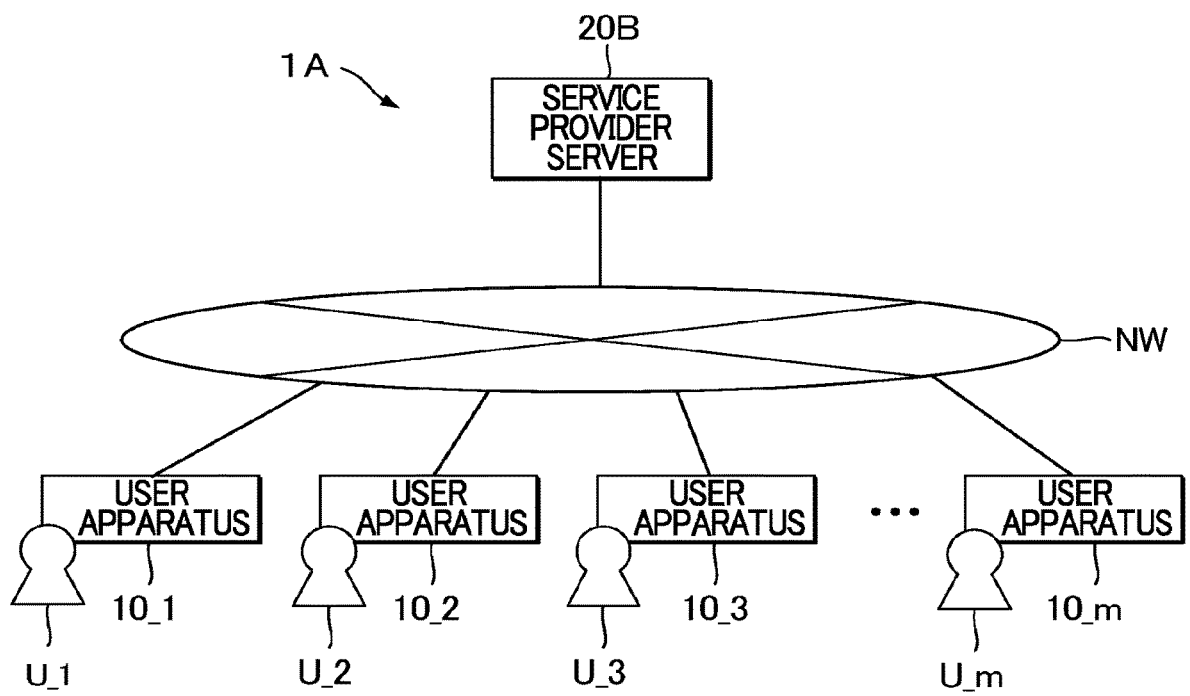
FIG. 12 is a block diagram showing an overall configuration of a service system of a third embodiment.

A service system 1A of the third embodiment will be described with reference to the drawings. FIG. 12 is a block diagram illustrating a configuration of the service system 1A of the third embodiment. In the service system 1 of the second embodiment, the profile server 20A manages profiles and generates profile information, and the lender user apparatus 10_1 generates a relationship degree based on the profile information. In contrast, the service system 1A according to the third embodiment generates a relationship degree at a lender user apparatus 10_1 without using the profile server 20A.

The lender user apparatus 10_1 in the third embodiment is configured in the same manner as the lender user apparatus 10_1 in the second embodiment, except that the user apparatus 10_1 stores a proximity time table TBLc in the storage device 12. The functions of the lender user apparatus 10_1 in the third embodiment are different from those of the lender user apparatus 10_1 in the second embodiment. The service provider server 20B of the third embodiment has the same configuration and functions as those of the service provider server 20B of the second embodiment.

3.1. Functions of Third Embodiment

Figure 13:
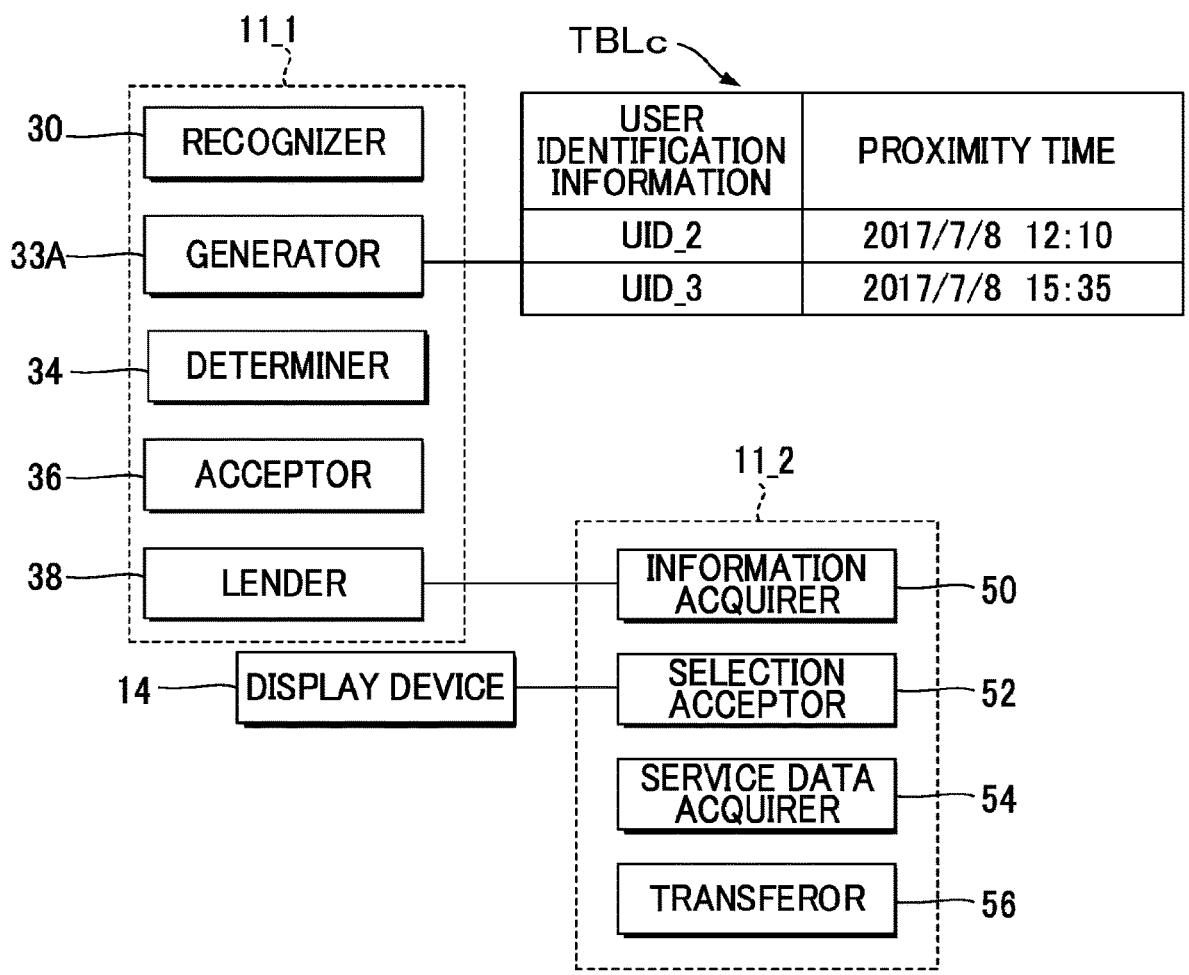
FIG. 13 is a functional block diagram showing functions of the service system of the third embodiment.

FIG. 13 is a functional block diagram showing the functions of the user apparatus 10_1, the user apparatus 10_2, and the service provider server 20B. The same reference signs are assigned to the same elements as those in FIG. 10, and description thereof is omitted.

The processor 11_1 of the lender user apparatus 10_1 has a generator 33A in place of the generator 33. The proximity time table TBLc stores therein user identification information of users U who manage user apparatuses 10 located within a predetermined range recognized at the recognizer 30, and a proximity time that indicates since when each of the users has stayed within the predetermined range. In the example shown in FIG. 13, it will be understood that the user apparatus 10_2 corresponding to the user identification information UID_2 has stayed within the predetermined range since 12:10 on Jul. 8, 2017, and that the user apparatus 10_3 corresponding to the user identification information UID_3 has stayed within the predetermined range since 15:35 on Jul. 8, 2017.

The generator 33A generates a relationship degree based on the length of time that the user apparatus 10 is located within the predetermined range. The relationship degree represents a duration during which the user apparatus 10 has stayed within the predetermined range in minutes, for example. For example, if the current day and time is 15:40 on Jul. 8, 2017, a relationship degree α12 between the first user U_1 and the second user U_2 is "210" (minutes), and a relationship degree α13 between the first user U_1 and the third user U_3 is "5" (minutes). That is, the longer they stay in the predetermined range, the greater the relationship degree.

3.2. Operation of Third Embodiment

Figure 14:
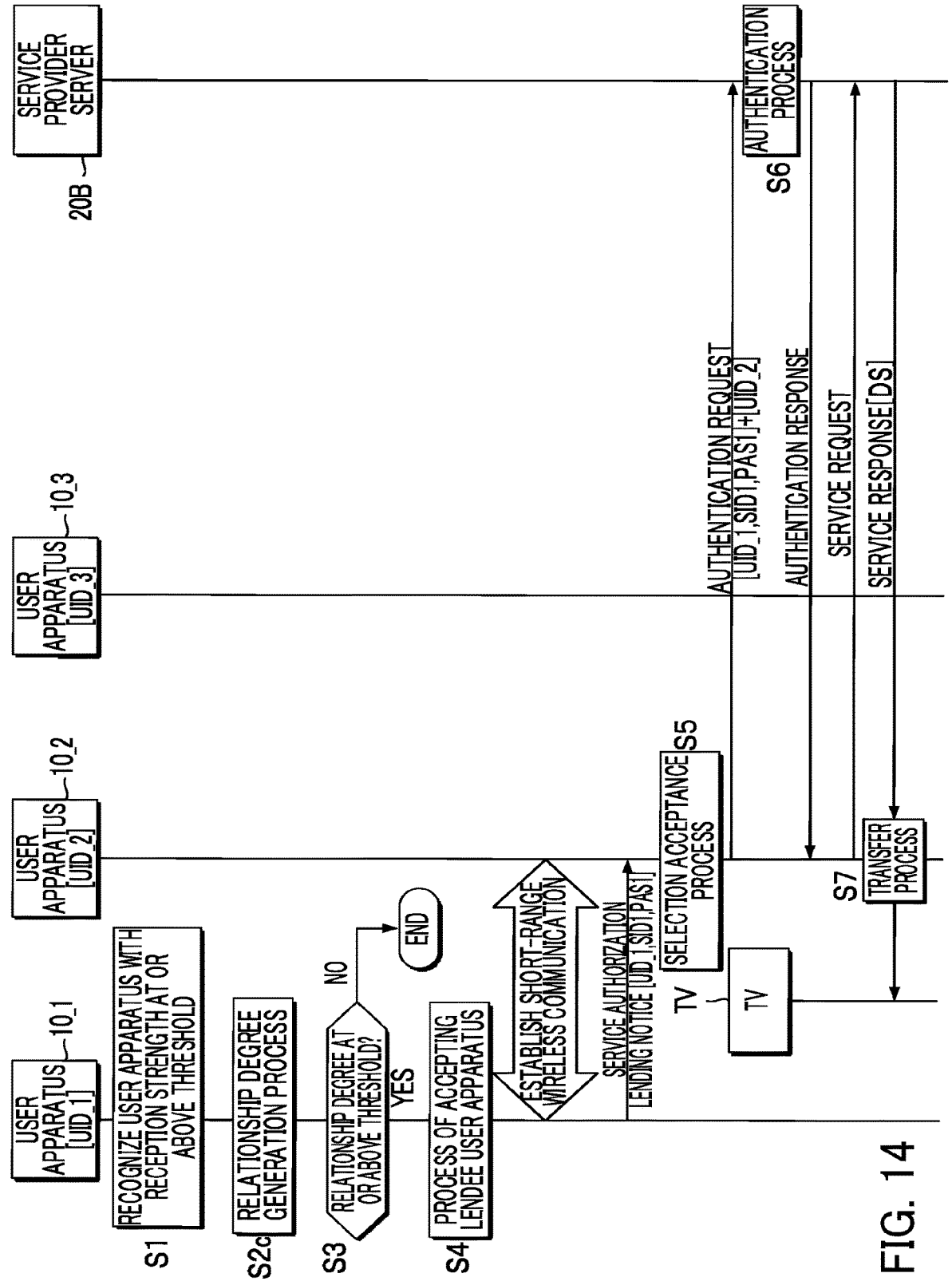
FIG. 14 is a sequence chart showing an operation of the service system of the third embodiment.

Next, referring to FIG. 14, the operation of the third embodiment will be described. FIG. 14 is a sequence chart illustrating an operation of the service system 1A in the third embodiment. In this example, the user U who is the lender of usage authorization of the service is a first user U_1 managing the user apparatus 10_1, and the user U who is the lendee of usage authorization of the service is a second user U_2 managing the user apparatus 10_2. In FIG. 14, operations similar to those of the second embodiment are assigned the same reference signs, and description thereof is omitted.

First, the recognizer 30 of the lender user apparatus 10-1 recognizes a user apparatus 10 of which the reception strength is at a predetermined level or greater by use of the short-range wireless communicator 18 (S1). The generator 33A of the user apparatus 10-1 then generates a relationship degree based on the duration during which the recognized user apparatus 10 has stayed within the predetermined range. Then, based on the generated relationship degree, a user apparatus 10, which will be a lendee, is determined (S3, S4).

According to the service system 1A of the third embodiment, there is no need to acquire the relationship degree or profile information from the profile server 20A because the relationship degree is generated by the lender user apparatus 10_1. Therefore, the configuration of the service system 1A can be simplified.

4. Modifications

The present invention is not limited to each of the above illustrated embodiments. Specific modifications are illustrated below. Two or more modes freely selected from the following examples may be combined.

(1) In each of the above-described embodiments, at the lender user apparatus 10_1, the determiner 34 determines whether a relationship degree is at or above a threshold. However, in a case in which there are multiple services available to the first user U_1, a threshold as used by the determiner 34 may be determined depending on a service subject to the lending of the usage authorization, the service being specified by the first user U_1.

Figure 15:
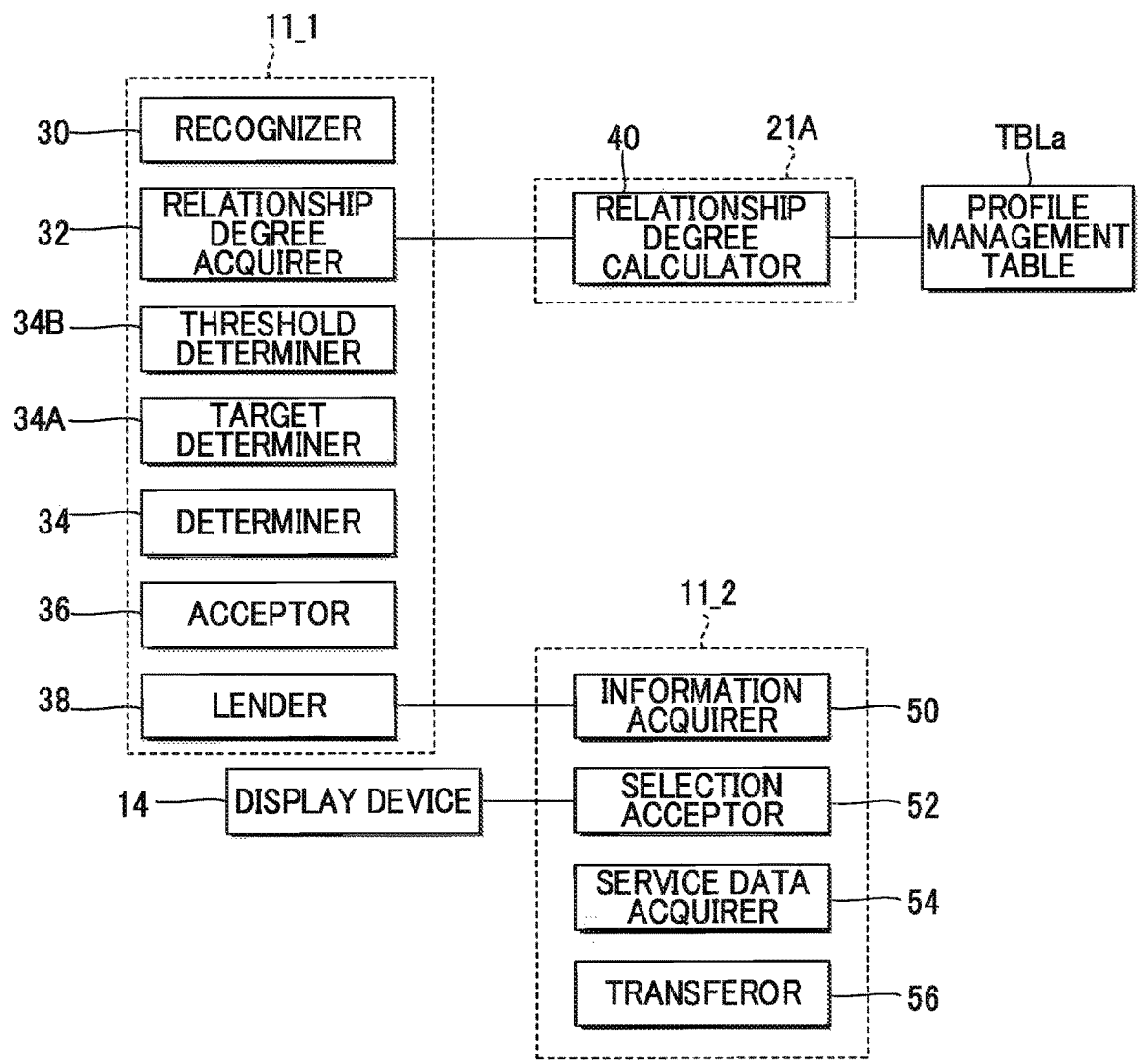
FIG. 15 is a functional block diagram showing functions of a service system according to modification 1.

FIG. 15 shows a functional block diagram of a service system 1 according to modification 1. The service system 1 of modification 1 is configured in the same manner as the service system 1 of the first embodiment shown the figure, except that it is provided with a target determiner 34A and a threshold determiner 34B at the lender user apparatus 10_1.

Figure 16:
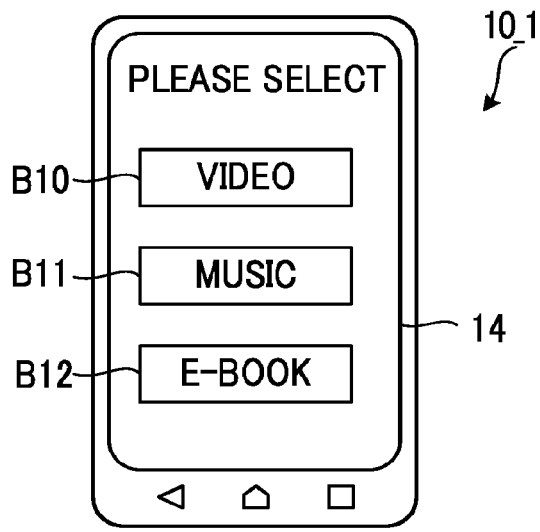
FIG. 16 is an explanatory diagram of an example of a selection screen for determining a service for which the authorization to use is to be lent, according to modification 1.

The target determiner 34A determines a service subject to the lending of the usage authorization specified by the first user U_1, when there are multiple services available to the first user U_1. Specifically, the target determiner 34A displays services available to the first user U_1 on the display device 14, as shown in FIG. 16, for example, thereby prompting the first user U_1 to select one of the services. In this example, the user U_1 can use a video distribution service, a music distribution service, and an e-book reading service. When the first user U_1 presses one of the buttons B10 to B12, the target determiner 34A determines that a service that corresponds to the pressed button is the service for which the usage authorization is to be lent.

The threshold determiner 34B determines a threshold depending on the service subject to the lending of the usage authorization specified by the first user U_1 from among a plurality of services available to the first user U_1. For example, the higher the billing, the higher the threshold may be set.

In modification 1, since the threshold is determined depending on a service subject to the lending of the usage authorization, it is possible to distinguish between services to be lent only when the relationship degree is high and services to be lent even when the relationship degree is low. In particular, by setting a higher threshold when the billing rate is higher, the more it is possible to lend usage authorization to a user U with a high degree of relationship when the billing rate is higher.

(2) In each of the above-described embodiments, the lender 38 of the lender user apparatus 10_1 may transmit to the lendee user apparatus 10 a service authorization lending notice that includes usage information indicative of the content (type) of the service for which the usage authorization is lent. The content of the service may comprise, for example, video distribution, music distribution, or photo processing.

When the selection acceptor 52 of the lendee user apparatus 10 acquires the usage information together with the authorization information, the selection acceptor 52 extracts, based on the usage information, one or more devices available for use of the service to be lent, from among one or more devices capable of short-range wireless connection, and displays the extracted device or devices on the display device 14.

Figure 17:
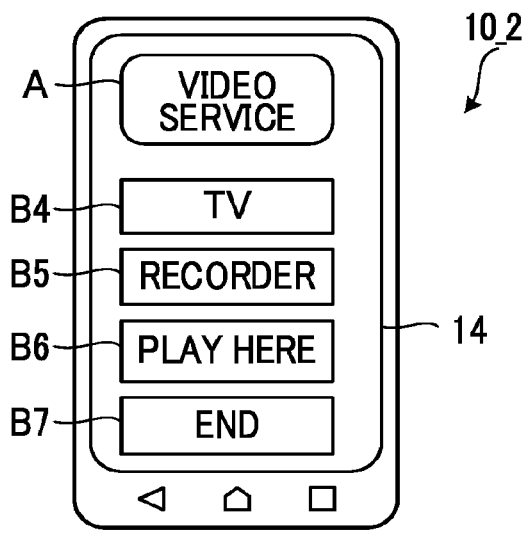
FIG. 17 is an explanatory diagram of an example of a selection screen displayed on a display device by a selection acceptor, according to modification 2.

For example, when the content of the service is video distribution, the selection acceptor 52 displays on the display device 14 a selection screen such as shown in FIG. 17. In the selection screen of FIG. 17, compared to the selection screen shown in FIG. 7, the button B3 corresponding to the AV amplifier 182 is not displayed. This is because the AV amplifier 182 cannot play the service data DS, which is video.

In modification 2, the display device 14 displays the device or devices available for use of the service based on the usage information, so that the user U who is the lendee can be prevented from incorrectly specifying the destination of the service data DS.

(3) In each of the above embodiments, the transferor 56 of the lender user apparatus 10_2 terminates the transfer of the service data DS when the short-range wireless connection with the lender is disconnected. However, the present invention is not limited thereto. The transferor 56 may continue the transfer of the service data DS during playback of content corresponding to the provision of the service even when the short-range wireless connection with the lender user apparatus 10_1 is disconnected, and terminate the transfer of the service data DS when the playback of the content ends.

Figure 18:
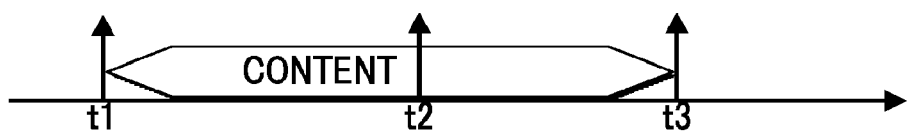
FIG. 18 is an explanatory diagram for explaining completion of service data transfer in a unit of content, according to modification 3.

For example, as shown in FIG. 18, the playback of the content starts at time t1, and even when the short-range wireless connection between the lender user apparatus 10_1 and the lendee user apparatus 10_2 is disconnected at time t2, the transferor 56 continues to transfer the service data DS. The transferor 56 terminates the transfer of the service data DS when the playback of the content ends at time t3.

The transfer of the service data DS is terminated upon disconnection of the short-range wireless connection in order to avoid the unrestricted use of the service by the lendee user U by lending the usage authorization in a state in which the lender user U and the lendee user U are in close proximity to each other. In modification 3, if the short-range wireless connection between the lender user apparatus 10 and the lendee user apparatus 10 is disconnected during the playback of the content, the service data DS is transferred until the end of the content, and this configuration has an advantage that the playback of the content is not interrupted midway. Even with this configuration, there is no inconvenience such as the unrestricted use of the service by the lendee user U because the lender user U and the lendee user U were in close proximity when the playback of the content started.

(4) The block diagram used to describe each of the above embodiments shows blocks of functional units. These functional blocks (components) are realized by any combination of hardware and/or software. The means for realizing each functional block is not particularly limited. That is, each functional block may be realized by one physically and/or logically coupled apparatus. Alternatively each functional block may be realized by connecting directly and/or indirectly (e.g., wired and/or wirelessly) two or more physically and/or logically separated apparatuses and using these devices. The term "apparatus" used in the description of each of the above-described embodiments may be read into other terms such as circuitry, device or unit.

(5) The order of processes, sequences, flowcharts, etc., that have been used to describe the examples and embodiments in each of the above-described embodiments may be changed as long as they do not conflict. For example, although a variety of methods have been illustrated in this specification with a variety of elements of steps in exemplary orders, the specific orders presented herein are by no means limiting.

(6) In each of the above-described embodiments, the input/output information, etc., may be stored in a specific location (e.g., memory) or may be managed by a management table. The input/output information, etc., may be overwritten, updated, or additional information may be appended thereto. The output information, etc., may be deleted. The input information, etc., may be transmitted to other devices.

(7) In each of the above-described embodiments, decisions may be made in values that can be represented by one bit (0 or 1), may be made in Boolean values (true or false), or may be made by comparing numerical values (e.g., comparison against a predetermined value).

(8) In each of the above-described embodiments, a portable information processing apparatus, such as a cell phone or a smartphone, is illustrated as the user apparatus 10. However, the specific form of the user apparatus 10 can be freely selected and is not limited to the examples of the above-described forms. For example, a portable personal computer may be used as the user apparatus 10.

(9) In each of the above-described embodiments, the storage device 12 is a recording medium readable by the processor 11, such as ROM and RAM, but may be a flexible disk, a magnetic optical disk (e.g., a compact disk, a digital multi-purpose disk, a Blu-ray (registered trademark) disk), a smart card, a flash memory device (e.g., a card, a stick, a key drive), a compact disc-ROM (CD-ROM), a register, a removable disk, a hard disk, a floppy (registered trademark) disk, a magnetic strip, a database, a server, or other suitable storage medium. The program may also be transmitted from the network NW. The program may also be transmitted from a communications network via a telecommunications line. The storage devices 22A and 22B are the same as the storage device 12.

(10) Each of the above embodiments may be applied to systems that use long term evolution (LTE), LTE-Advanced (LTE-A), SUPER 3G, IMT-Advanced, 4G, 5G, FRA (Future Radio Access), W-CDMA (registered trademark), GSM (registered trademark), CDMA2000, ultra-mobile broadband (UMB), IEEE 802.11 (Wi-Fi), IEEE 802.16 (WiMAX), IEEE 802.20, ultra-wideband (UWB), Bluetooth (registered trademark), and other appropriate systems and/or next generation systems extended based on these systems.

(11) In each of the above-described embodiments, the information and signals and the like described may be represented by using any of a variety of different technologies. For example, data, instructions, commands, information, signals, bits, symbols, chips, and the like that may be referred to throughout the above description may be represented by voltages, currents, electromagnetic waves, magnetic fields or magnetic particles, optical fields or photons, or any combination thereof. The terms described herein and/or terms necessary for the understanding of the specification may be replaced with terms having the same or similar meanings.

(12) Each of the functions illustrated in FIG. 5, FIG. 10, FIG. 13, and FIG. 15 is realized by any combination of hardware and software. Each function may be realized by a single apparatus or by two or more apparatuses configured separately from each other.

(13) The program illustrated in each of the above embodiments, whether referred to as software, firmware, middleware, microcode or hardware description language or called by any other name, shall be construed broadly to mean instructions, instruction sets, code, code segments, program code, subprograms, software modules, applications, software applications, software packages, routines, subroutines, objects, executable files, threads of execution, procedures, functions, etc. The software, instructions, etc., may also be transmitted and received via a transmission medium. For example, when the software is transmitted from a website, server, or other remote sources, by using wired technologies such as coaxial cables, fiber optic cables, twisted-pair cables, and digital subscriber line (DSL), and/or wireless technologies such as infrared, radio and microwaves, these wired technologies and/or wireless technology are included within the definition of the transmission medium.

(14) In each of the above-described embodiments, the terms "system" and "network" are used interchangeably.

(15) In each of the above-described embodiments, the information, parameters, etc., may be represented in absolute values, in relative values with respect to a predetermined value, or in other pieces of applicable information. For example, the radio resource may be indicated by indices.

(16) In each of the above-described embodiments, the user apparatus 10 may be a mobile station. A mobile station may be referred to by those skilled in the art as a subscriber station, a mobile unit, a subscriber unit, a wireless unit, a remote unit, a mobile device, a wireless device, a wireless communicator, a remote device, a mobile subscriber station, an access terminal, a mobile terminal, a wireless terminal, a remote terminal, a handset, a user agent, a mobile client, a client, or some other suitable terms.

(17) In each of the above embodiments, the term "connected" or any modification thereof means any direct or indirect connection or coupling between two or more elements, and may include the presence of one or more intermediate elements between two elements that are "connected" to each other. The connection between the elements may be physical, logical, or a combination of these. As used herein, it may be considered that two elements are "connected" to each other by using one or more wires, cables and/or printed electrical connections and, and to name some non-limiting and non-inclusive examples, by using electromagnetic energy, such as electromagnetic energy having wavelengths in the radio frequency domain, microwave domain, and optical (both visible and invisible) domain.

(18) In each of the above-described embodiments, the phrase "based on" does not mean "solely based on" unless otherwise stated. In other words, the phrase "based on" means both "based solely" and "based at least on".

(19) Any reference to elements using the designations "first," "second," etc., as used herein does not limit the amount or order of those elements in general. These designations may be used herein as a convenient way to distinguish between two or more elements. Thus, reference to the first and second elements does not mean that only two elements can be employed therein, or that the first element must somehow precede the second element.

(20) To the extent that "including", "comprising", and modifications thereof in each of the above embodiments are used herein or in the claims, those terms are intended to be inclusive in a manner similar to the term "provided" is used. Furthermore, it is intended that the term "or" as used herein or in the claims is not an exclusive disjunction.

(21) Throughout this Application, if articles are added by translation, such as "a", "an" and "the" in English, these articles include the plural, unless the context clearly indicates otherwise.

(22) It should be obvious to those skilled in the art that the present invention is not limited to the embodiments described herein. The invention can be implemented as a modified and changed form without departing from the spirit and scope of the present invention defined based on the recitation of the claims. Accordingly, the description herein is for illustrative purposes only and has no restrictive implications for the invention. A plurality of modes selected from the modes illustrated herein may also be combined.

DESCRIPTION OF REFERENCE SIGNS 1, 1A . . . service system, 10 . . . user apparatus, 11 . . . processor, 20A . . . profile server (management apparatus), 20B . . . service provider server (service provider apparatus), 31 . . . profile acquirer, 32 . . . relationship degree acquirer, 33, 33A . . . generator, 34 . . . determiner, 34B . . . threshold determiner, 36 . . . acceptor, 38 . . . lender, 52 . . . selection acceptor, 56 . . . transferor, DS . . . service data

The invention claimed is:

1. A user apparatus capable of communicating with another user apparatus, comprising:
one or more memories configured to store instructions; and
one or more processors configured to execute the stored instructions to:
determine whether a relationship degree indicative of a degree of depth of relationship between a first user who manages the user apparatus and a second user who manages another user apparatus that is located within a predetermined range from the user apparatus is at or above a threshold of the relationship degree;
in response to the relationship degree being at or above the threshold of the relationship degree, accept from the first user an input of an instruction that permits lending to the second user a usage authorization for using a service that is available for use by the first user at the user apparatus; and
in response to the input of the instruction from the first user, provide the another user apparatus with authorization information to enable the second user to use the service at the another user apparatus,
wherein:
the authorization information relates to authentication required for the first user to use the service, and
the lending the authorization information includes providing, to the another user apparatus, first user identification information identifying the first user, together with the authorization information, such that the authorization information and the first identification information is transmitted from the another user apparatus to a server providing the service.

2. The user apparatus according to claim 1, wherein the one or more processors are configured to execute the stored instructions to:
transmit to a management apparatus first user identification information that identifies the first user and second user identification information that identifies the second user; and
receive from the management apparatus the relationship degree, which is generated at the management apparatus based on the first user identification information and the second user identification information.

3. The user apparatus according to claim 1, wherein the one or more processors are configured to execute the stored instructions to:
transmit to a management apparatus first user identification information that identifies the first user and second user identification information that identifies the second user,
receive from the management apparatus:
first profile information indicating a profile of the first user, wherein the profile of the first user is managed in association with the first user identification information in the management apparatus, and
second profile information indicating a profile of the second user, wherein the profile of the second user is managed in association with the second user identification information in the management apparatus; and
generate the relationship degree based on the first profile information and the second profile information.

4. The user apparatus according to claim 1, wherein the one or more processors are configured to execute the stored instructions to generate the relationship degree based on a length of time over which the another user apparatus is located within the predetermined range.

5. The user apparatus according to claim 1, wherein the one or more processors are configured to execute the stored instructions to determine the threshold depending on a service for which lending of the usage authorization is specified by the first user, from among a plurality of services available to the first user.

6. An external apparatus capable of communicating with the user apparatus according to claim 1, the external apparatus comprising:
a display unit configured to display images;
one or more memories configured to store instructions; and
one or more processors configured to execute the stored instructions to:
upon acquiring the authorization information from the user apparatus, accept a selection, by the second user, of one of one or more devices capable of short-range wireless connection with the external apparatus, by displaying the one or more devices on the display unit; and
upon acquiring service data from a service provider apparatus that provides the service in response to transmission of the authorization information to the service provider apparatus, transfer the service data to the one of one or more device, the selection of which has been accepted,
wherein the external apparatus is the another user apparatus managed by the second user.

7. The external apparatus according to claim 6, wherein the one or more processors of the external apparatus are configured to execute the stored instructions to, upon acquiring, together with the authorization information, usage information indicating content of the service for which the usage authorization is to be lent:
extract, based on the usage information, a device available for use of the service to be lent, from among the one or more devices, and
display the extracted device on the display unit.

8. The external apparatus according to claim 6, wherein:
the external apparatus is connected to the user apparatus by a short-range wireless connection, and
the one or more processors of the external apparatus are configured to execute the stored instructions to terminate the transfer of the service data when the short-range wireless connection between the external apparatus and the user apparatus is disconnected.

9. The external apparatus according to claim 6, wherein:
the external apparatus is connected to the user apparatus by a short-range wireless connection, and
the one or more processors of the external apparatus are configured to execute the stored instructions to:
continue to transfer the service data during playback of content corresponding to provision of the service when the short-range wireless connection with the user apparatus is disconnected, and
terminate the transfer of the service data when the playback of the content ends.

10. The user apparatus according to claim 2, wherein the one or more processors are configured to execute the stored instructions to determine the threshold depending on a service for which lending of the usage authorization is specified by the first user, from among a plurality of services available to the first user.

11. The user apparatus according to claim 3, wherein the one or more processors are configured to execute the stored instructions to determine the threshold depending on a service for which lending of the usage authorization is specified by the first user, from among a plurality of services available to the first user.

12. The user apparatus according to claim 4, wherein the one or more processors are configured to execute the stored instructions to determine the threshold depending on a service for which lending of the usage authorization is specified by the first user, from among a plurality of services available to the first user.

13. The external apparatus according to claim 7, wherein:
the external apparatus is connected to the user apparatus by a short-range wireless connection, and
the one or more processors of the external apparatus are configured to execute the stored instructions to terminate the transfer of the service data when the short-range wireless connection between the external apparatus and the user apparatus is disconnected.

14. The external apparatus according to claim 7, wherein:
the external apparatus is connected to the user apparatus by a short-range wireless connection, and
the one or more processors of the external apparatus are configured to execute the stored instructions to:
continue to transfer the service data during playback of content corresponding to provision of the service when the short-range wireless connection with the user apparatus is disconnected, and
terminate the transfer of the service data when the playback of the content ends.

15. The user apparatus according to claim 1, the authorization information includes service identification information and a password required for the first user to receive the service.

16. The user apparatus according to claim 1, providing the authorization information and the first user identification information to the another user apparatus includes encrypting the authorization information and the first user identification information.

17. The user apparatus according to claim 1, wherein the one or more processors are configured to execute the stored instructions to establish a short-range wireless connection with the another user apparatus through a short-range wireless communicator, to transmit the authorization information and the first user identification information to the another user apparatus.

18. The user apparatus according to claim 1, wherein the service is a content providing service, and the content providing service is any one of a video distribution service, a music distribution service, and an e-book reading service.

19. The user apparatus according to claim 1, wherein the predetermined range is a range within which a reception intensity of a short-range wireless communication at the user apparatus is at or above a predetermined level.

20. The user apparatus according to claim 5, wherein the threshold of the relationship degree is determined such that the threshold increases as a billing rate for receiving the service is high.

* * * * *